US011633707B2

(12) United States Patent
McGahee et al.

(10) Patent No.: US 11,633,707 B2
(45) Date of Patent: Apr. 25, 2023

(54) BI-MODAL RADIAL FLOW REACTOR

(71) Applicant: Chevron Phillips Chemical Company LP, The Woodlands, TX (US)

(72) Inventors: Vincent D. McGahee, Kemah, TX (US); Cameron M. Crager, Beaumont, TX (US); William D. Treleaven, Porter, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 0 days.

(21) Appl. No.: 17/568,957

(22) Filed: Jan. 5, 2022

(65) Prior Publication Data

US 2022/0126248 A1    Apr. 28, 2022

Related U.S. Application Data

(63) Continuation of application No. 17/022,500, filed on Sep. 16, 2020, now Pat. No. 11,369,931, which is a
(Continued)

(51) Int. Cl.
*B01J 8/02* (2006.01)
*B01J 8/04* (2006.01)
(Continued)

(52) U.S. Cl.
CPC ........... *B01J 8/0278* (2013.01); *B01J 8/0285* (2013.01); *B01J 8/0411* (2013.01); *B01J 8/0419* (2013.01);
(Continued)

(58) Field of Classification Search
CPC ...... B01J 8/0214; B01J 8/0278; B01J 8/0285; B01J 8/0411; B01J 8/0492; B01J 8/0496;
(Continued)

(56) References Cited

U.S. PATENT DOCUMENTS 2,450,804 A * 10/1948 Loy ................. B01J 8/0403
422/223
3,907,665 A    9/1975 Winter, III
(Continued)

FOREIGN PATENT DOCUMENTS

| CN | 105457563 B | 3/2020 |
|---|---|---|
| EP | 1379609 B1 | 12/2006 |
| EP | 1419813 B1 | 5/2012 |

OTHER PUBLICATIONS

"Internals for Radial Flow Reactors" by Johnson Screens, Copyright 2006, 12 p.
(Continued)

*Primary Examiner* — Lessanework Seifu

(57) ABSTRACT

A bi-modal radial flow reactor comprising a cylindrical outer housing surrounding at least five cylindrical, concentric zones, including at least three annulus vapor zones and at least two catalyst zones. The at least two catalyst zones comprise an outer catalyst zone and an inner catalyst zone. The at least three annulus vapor zones comprise an outer annulus vapor zone, a middle annulus vapor zone, and a central annulus vapor zone, wherein the central annulus vapor zone extends along a centerline of the bi-modal radial flow reactor. The outer catalyst zone is intercalated with the outer annulus vapor zone and the middle annulus vapor zone, and the inner catalyst zone is intercalated with the middle annulus vapor zone and the central annulus vapor zone. A removable head cover can be fixably coupled to a top of the cylindrical outer housing to seal a top of the bi-modal radial flow reactor.

10 Claims, 10 Drawing Sheets

Related U.S. Application Data continuation of application No. 16/655,618, filed on Oct. 17, 2019, now Pat. No. 10,799,843, which is a continuation of application No. 16/285,393, filed on Feb. 26, 2019, now Pat. No. 10,478,794.

(51) Int. Cl.
  *B01J 29/60* (2006.01)
  *B01J 37/02* (2006.01)

(52) U.S. Cl.
  CPC ............ *B01J 8/0492* (2013.01); *B01J 29/60* (2013.01); *B01J 37/0201* (2013.01); *B01J 2208/00548* (2013.01); *B01J 2208/00814* (2013.01); *B01J 2208/00893* (2013.01)

(58) Field of Classification Search
  CPC .... B01J 2208/00548; B01J 2208/00893; B01J 2208/00938; B01J 2208/00814
  See application file for complete search history.

(56) References Cited

U.S. PATENT DOCUMENTS

| | | | |
|---|---|---|---|
| 4,423,022 A | 12/1983 | Albano |
| 4,478,793 A | 10/1984 | Vickers |
| 5,389,235 A | 2/1995 | Russ |
| 5,601,698 A | 2/1997 | Innes |
| 5,866,743 A | 2/1999 | Heyse |
| 5,879,538 A | 3/1999 | Haritatos |
| 6,063,264 A | 5/2000 | Haritatos |
| 6,620,386 B1 | 9/2003 | Welch |
| 6,689,329 B2 | 2/2004 | Gupta |
| 6,812,180 B2 | 11/2004 | Fukunaga |
| 7,125,529 B2 | 10/2006 | Ablin |
| 7,153,801 B2 | 12/2006 | Wu |
| 7,220,392 B2 | 5/2007 | Rong |
| 7,226,568 B1 | 6/2007 | Ham |
| 7,500,999 B2 | 3/2009 | Aaron |
| 7,544,335 B2 | 6/2009 | Scanlon |
| 7,854,906 B2 | 12/2010 | Olbert |
| 7,932,425 B2 | 4/2011 | Blessing |
| 8,187,560 B2 | 5/2012 | Fischel |
| 8,362,310 B2 | 1/2013 | Blessing |
| 8,506,796 B2 | 8/2013 | Senetar |
| 8,569,555 B2 | 10/2013 | Blessing |
| 8,715,584 B2 | 5/2014 | Sanchez |
| 9,050,571 B2 | 6/2015 | Siedler |
| 9,085,736 B2 | 7/2015 | Morrison |
| 10,233,396 B1 | 3/2019 | Khankal |
| 2006/0225347 A1 | 10/2006 | Lee |
| 2007/0264177 A1 | 11/2007 | Erikstrup |
| 2010/0276336 A1 | 11/2010 | Ferschneider |
| 2015/0328612 A1 | 11/2015 | Bazer-Bachi |
| 2015/0343406 A1 | 12/2015 | Zhang |
| 2018/0065115 A1 | 3/2018 | Alvez-Manoli |
| 2021/0115341 A1 | 4/2021 | Sampath |

OTHER PUBLICATIONS

International Search Report and Written Opinion of International Patent Application No. PCT/US2020/019452, dated May 18, 2020, 11 pages.

* cited by examiner

BI-MODAL RADIAL FLOW REACTOR

CROSS-REFERENCE TO RELATED APPLICATIONS

This application is a continuation of and claims priority to U.S. patent application Ser. No. 17/022,500 filed Sep. 16, 2020 and published as U.S. Patent Application Publication No. 2021/0001296 A1, which is a continuation of and claims priority to U.S. patent application Ser. No. 16/655,618 filed Oct. 17, 2019, now U.S. Pat. No. 10,799,843 B2, which is a continuation of and claims priority to U.S. patent application Ser. No. 16/285,393, filed Feb. 26, 2019, now U.S. Pat. No. 10,478,794 B1, each entitled "Bi-Modal Radial Flow Reactor," the disclosure of each of which is incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The disclosed apparatus, systems, and methods relate to radial flow reactors. More specifically, the disclosed apparatus, systems, and methods relate to bi-modal radial flow reactors. Still more specifically, the disclosed apparatus, systems, and methods relate to bi-modal radial flow reactors comprising at least three annulus vapor zones and at least two catalyst zones.

BACKGROUND

A radial reactor comprises a cylindrical reactor body containing specially designed reactor internals. The main reactor internals that provide the radial flow pattern in a conventional radial flow fixed bed reactor are an inlet barrier (pie plates), an inlet distributing header and an axial outlet collecting header. The two primary types of inlet distributors include wedge wire screens and series of scallops, with each scallop comprising a perforated half cylinder having a relatively small diameter positioned around the circumference of the vessel. The axial outlet collecting header may be in the form of a perforated cylinder or 'centerpipe'. Catalyst is generally charged to an annular space positioned between the inlet distributing header and the centerpipe, and the top of the catalyst bed is covered with a cover plate.

Depending on the axial direction of the flow in the distributing channel and the centerpipe, radial flow reactors may be classified as z-flow type or π-flow type. Depending on the radial flow direction in the reactor, radial flow reactors can be further classified into centripetal (CP) or centrifugal (CF) flow types. In the CP-flow type, gas is fed to the distributing channel and travels radially from the outer screen to the centerpipe, while in the CF-flow type, gas is fed to the centerpipe and travels radially from the centerpipe to the outer screen. Four flow configurations are thus typical for conventional radial flow reactors; these can be classified as CP-z, CP-π, CF-z and CF-π configurations.

Conventional radial flow reactors thus comprise a single catalyst bed, with gas feed being introduced into the distributing channel or the centerpipe and product being removed in the same or the opposite axial direction from the centerpipe or the distributing channel following passage through the single catalyst bed.

Radial flow reactors are often utilized to carry out endothermic reactions. Reforming reactions, such as the ARO-MAX® Process by Chevron Phillips Chemical Company LP, The Woodlands, Tex., are extremely endothermic. As vaporized feed transits the reactor bed (e.g., from the wire screen or the scallops to the centerpipe), the temperature of the catalyst may quickly drop below the activation temperature for the dehydrogenation reactions. As working catalyst deactivates, the reactor inlet temperature is increased in order to compensate for loss of activity. The deactivated catalyst is also a less selective catalyst and has significant activity for hydrocarbon cracking reactions. This deactivated catalyst is also at the higher temperature which also results in more cracked products being produced. The cracked products represent a significant downgrade from the value of the more expensive feed (valued as a gasoline blendstock) to light hydrocarbons (valued as fuel gas). Economic end of run is then met when the amount of value lost to light hydrocarbons by cracking is greater than or equal to the cost of replacing the catalyst and the cost of the lost production during the replacement. When economic end of run criteria is reached much of the catalyst near the vapor outlet zone is not fully utilized.

Accordingly, there exists a need for improved radial flow reactors, as well as systems and methods employing such reactors. Desirably, such reactors, systems and methods enable improved catalyst utilization, minimized downtime, and/or minimized coking.

SUMMARY

Herein disclosed is a bi-modal radial flow reactor comprising: a cylindrical outer housing surrounding at least five cylindrical, concentric zones, including at least three annulus vapor zones and at least two catalyst zones, wherein the at least two catalyst zones comprise an outer catalyst zone and an inner catalyst zone, and wherein the at least three annulus vapor zones comprise an outer annulus vapor zone, a middle annulus vapor zone, and a central annulus vapor zone, wherein the central annulus vapor zone extends along a centerline of the bi-modal radial flow reactor, and wherein the outer catalyst zone is intercalated with the outer annulus vapor zone and the middle annulus vapor zone, and wherein the inner catalyst zone is intercalated with the middle annulus vapor zone and the central annulus vapor zone; and a removable head cover fixably coupled to a top of the cylindrical outer housing to seal a top of the bi-modal radial flow reactor.

Also disclosed herein is a bi-modal radial flow reactor comprising: a cylindrical outer housing surrounding at least five cylindrical, concentric zones, including at least three annulus vapor zones and at least two catalyst zones, wherein the at least two catalyst zones comprise an outer catalyst zone and an inner catalyst zone, and wherein the at least three annulus vapor zones comprise an outer annulus vapor zone, a middle annulus vapor zone, and a central annulus vapor zone, wherein the central annulus vapor zone extends along a centerline of the bi-modal radial flow reactor, and wherein the outer catalyst zone is intercalated with the outer annulus vapor zone and the middle annulus vapor zone, and wherein the inner catalyst zone is intercalated with the middle annulus vapor zone and the central annulus vapor zone, wherein the bi-modal radial flow reactor does not comprise conventional bottom support ball media.

Further disclosed herein is a process for replacing catalyst in a bi-modal radial flow reactor, the process comprising: providing a bi-modal radial flow reactor, wherein the bi-modal radial flow reactor comprises: a cylindrical outer housing surrounding at least five cylindrical, concentric zones, including at least three annulus vapor zones and at least two catalyst zones, wherein the at least two catalyst zones comprise an outer catalyst zone and an inner catalyst zone, and wherein the at least three annulus vapor zones comprise an outer annulus vapor zone, a middle annulus vapor zone, and a central annulus vapor zone, wherein the central annulus vapor zone extends along a centerline of the bi-modal radial flow reactor, and wherein the outer catalyst zone is intercalated with the outer annulus vapor zone and the middle annulus vapor zone, and wherein the inner catalyst zone is intercalated with the middle annulus vapor zone and the central annulus vapor zone; operating the bi-modal radial flow reactor until a catalyst in a catalyst zone comprising the outer catalyst zone, the inner catalyst zone, or both is spent; and providing the catalyst zone with catalyst that is not spent.

Also disclosed herein is a bi-modal radial flow reactor comprising: a cylindrical outer housing surrounding at least five cylindrical, concentric zones, including at least three annulus vapor zones and at least two catalyst zones, wherein the at least two catalyst zones comprise an outer catalyst zone and an inner catalyst zone, and wherein the at least three annulus vapor zones comprise an outer annulus vapor zone, a middle annulus vapor zone, and a central annulus vapor zone, wherein the central annulus vapor zone extends along a centerline of the bi-modal radial flow reactor, and wherein the outer catalyst zone is intercalated with the outer annulus vapor zone and the middle annulus vapor zone, and wherein the inner catalyst zone is intercalated with the middle annulus vapor zone and the central annulus vapor zone, wherein the outer catalyst zone, the inner catalyst zone, or both the outer catalyst zone and the inner catalyst zone have a diameter in the range of from about 0.5 foot (0.15 m) to about 2 feet (0.61 m).

BRIEF DESCRIPTION OF THE DRAWINGS

The detailed description will reference the drawings briefly described below, wherein like reference numerals represent like parts, unless otherwise indicated.

DETAILED DESCRIPTION

Figure 1:
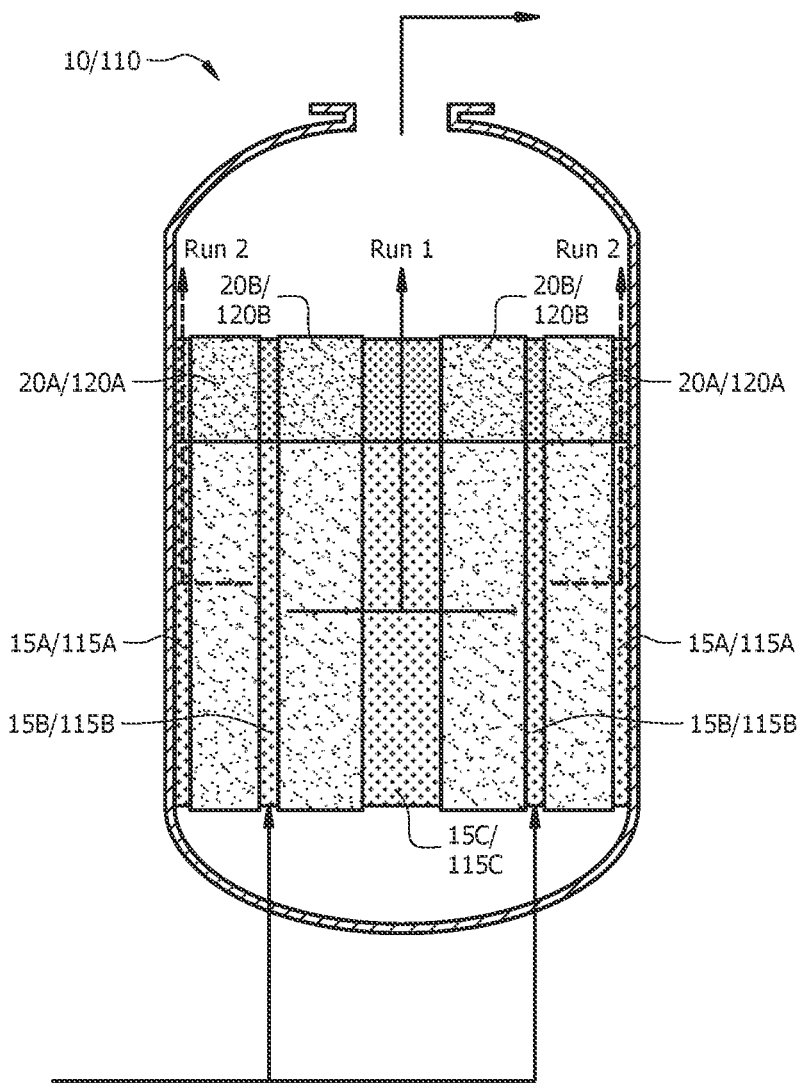
FIG. 1 is a simplified schematic of a bi-modal radial flow reactor of this disclosure.

With reference to FIG. 1, which is a simplified schematic of a bi-modal radial flow reactor 10/110 of this disclosure (which will be detailed further hereinbelow with reference to FIGS. 2 and 3), herein disclosed is a bi-modal radial flow reactor (BRFR) 10/110 that comprises at least three annulus vapor zones 15A/115A, 15B/115B, and 15C/115C and at least two catalyst zones 20A/120A and 20B/120B, systems comprising the bi-modal radial flow reactor, and methods of using the bi-modal radial flow reactor and systems comprising same. The BRFR is configured such that the catalyst volume is separated, within an individual reactor, into two or more individual catalyst zones and intercalated annulus vapor zones. The design of the flow paths on the bi-modal radial flow reactor may enable improved catalyst utilization, minimized downtime, and/or minimized coking relative to conventional 'uni-modal' radial flow reactors. For example, in embodiments, during a first part of a run, feed can be primarily introduced into a middle annulus vapor zone 15B/115B, primarily pass through an inner catalyst zone 20B/120B, and exit reactor 10/110 via central annulus vapor zone 15C/115C; during a second part of a run, feed can be primarily introduced into a middle annulus vapor zone 15B/115B, primarily pass through an outer catalyst zone 20A/120A, and exit reactor 10/110 via an outer annulus vapor zone 15A/115A. Thus, in embodiments, the system and method disclosed herein can be utilized to divide a volume of catalyst in sections (e.g., in half), and each section can be utilized differentially. Although at times described with reference to reforming/aromatization catalysts and reactions, it is to be understood that the herein-disclosed BRFR may be suitable for use with other catalysts and for other reactions.

In embodiments, the at least two catalyst zones of the BRFR comprise removable catalyst baskets. Such removable catalyst baskets may be removed via a top end of the BRFR. In embodiments, the at least two catalyst zones of the BRFR comprise fixed beds, which may be provided, in embodiments, by fixed baskets of catalyst or "fixed catalyst baskets". In such embodiments, one or both of the at least two catalyst zones may be configured with one or more ports fluidly connected with a bottom end thereof, such that catalyst can be removed therethrough.

The herein-disclosed BRFR further comprises a manifold that enables both introduction of a feed and removal of a product from a lower end of the BRFR. Since the manifold comprises piping for both the introduction of feed and the removal of effluent from a lower end of the BRFR, less piping is required, and removal of removable catalyst baskets from a top end of the BRFR is facilitated in removable catalyst basket BRFR configurations.

Also disclosed herein is a bi-modal radial flow guard bed reactor (BRFGBR) comprising at least two annulus vapor zones, at least two catalyst zones, and a bed separation zone. In embodiments, the at least two catalyst zones of the BRFGBR comprise removable catalyst baskets. Utilization of such a bi-modal radial flow guard bed reactor may obviate the need for a higher pressure drop guard reactor or sulfur converter adsorber, which may reduce capital cost relative to systems absent the BRFGBR.

Also disclosed herein is a system comprising more than one of the herein-disclosed reactors. In embodiments, a system of this disclosure comprises at least two reactors selected from the herein-disclosed BRFRs and BRFGBRs. A system of this disclosure may comprise at least two reactors selected from removable catalyst basket BRFRs, fixed catalyst basket or fixed catalyst bed BRFRs, and BRFGBRs. In embodiments, a system of this disclosure comprises a BRFGBR, at least one removable catalyst basket BRFR, and at least one fixed catalyst basket BRFR. In embodiments, a system of this disclosure comprises a removable catalyst basket BRFGBR, three removable catalyst basket BRFRs, and three fixed catalyst basket BRFRs. In such embodiments, the three removable catalyst basket BRFRs may be smaller (i.e., have a smaller total catalyst volume and/or reactor diameter than the fixed catalyst basket BRFRs; for design when the desired reactions incur large endothermic reactions, e.g., where larger diameter catalyst beds could not be fully utilized due to the rapid drop in reaction temperature across the radial beds. Methods of utilizing the herein-disclosed reactors and systems are also provided.

In a unimodal reactor, the process flow path is in one direction, whereas in the bi-modal reactor, as described herein, the process flow path can be in two directions within a single reactor shell. The bi-modal reactor provides for the ability to simultaneously flow the process through multiple beds contained within the same reactor, thereby decreasing the number of reactor shells required for a given weight or volume of catalyst used; alternatively, the process flow can be preferentially increased or decreased through each catalyst bed within the same reactor to improve catalyst utilization. Stated another way, the unimodal reactor has only one maximum across the reactor cross section for heat generated in exothermic reactions or for heat absorbed in endothermic reactions. In the bi-modal reactor, there can be two or more maxima across the reactor cross section for heat generated in exothermic reactions or for heat absorbed in endothermic reactions. As utilized herein 'bi-modal' when utilized to describe a radial flow reactor thus refers to a multiple path, split bed, split flow radial flow reactor that has two distinct flow paths through two beds, where the percent flow between the two beds can be varied.

Herein disclosed is a BRFR. In embodiments, the bi-modal radial flow reactor comprises a cylindrical outer housing or reactor body surrounding at least five cylindrical, concentric zones, including at least three annulus vapor zones and at least two catalyst zones. The at least two catalyst zones comprise an outer catalyst zone and an inner catalyst zone, and the at least three annulus vapor zones comprise an outer annulus vapor zone, a middle annulus vapor zone, and a central annulus vapor zone. The outer catalyst zone is intercalated with the outer annulus vapor zone and the middle annulus vapor zone, and the inner catalyst zone is intercalated with the middle annulus vapor zone and the central annulus vapor zone. The BRFR further comprises a manifold configured to introduce a feed vertically into a bottom end of each of one or two of the at least three annulus vapor zones, and remove a product from a bottom end of each of the one or two remaining of the at least three annulus vapor zones. The catalyst zones of a BRFR of this disclosure may comprise fixed catalyst beds (also referred to herein as fixed catalyst 'baskets'), or removable catalyst beds (also referred to herein as removable catalyst 'baskets'). Although potentially less desirable, a BRFR comprising at least one catalyst zone that is a fixed catalyst basket and at least one catalyst zone that is a removable catalyst basket is also within the scope of this disclosure.

As noted hereinabove, a BRFR of this disclosure may comprise a fixed bed or basket of catalyst. A fixed bed BRFR according to an embodiment of this disclosure will now be described with reference to FIG. 2A. As noted hereinabove, in embodiments, a BRFR of this disclosure comprises a cylindrical outer housing surrounding at least five cylindrical, concentric zones, including at least three annulus vapor zones and at least two catalyst zones. Fixed bed BRFR 10 comprises cylindrical outer housing or reactor body 5 surrounding five cylindrical, concentric zones, including three annulus vapor zones and two catalyst zones. The two catalyst zones comprise outer catalyst zone 20A and inner catalyst zone 20B, and the three annulus vapor zones comprise outer annulus vapor zone 15A, middle annulus vapor zone 15B, and central annulus vapor zone 15C. Outer catalyst zone 20A is intercalated with outer annulus vapor zone 15A and middle annulus vapor zone 15B, and inner catalyst zone 20B is intercalated with middle annulus vapor zone 15B and the central annulus vapor zone 15C.

Outer catalyst zone 20A and inner catalyst zone 20B may be delineated by basket screens, which may be bolted into place. The fixed catalyst beds or baskets may be provided by Vee-Wire® screens, wedge wire screens, or any appropriate wire screens which separate the two or more catalyst zones from the three or more annulus vapor zones. Vee-Wire® screens, or Johnson Screens are a brand of wedge wire screen from Bilfinger Water Technologies GmbH. In embodiments, outer catalyst zone 20A and inner catalyst zone 20B comprise reforming catalyst. The reforming catalyst may be any suitable reforming catalyst known to those of skill in the art. In embodiments, the reforming catalyst is one as described in detail hereinbelow. Perforated plates 12 may be utilized to set the pressure drop.

As noted hereinabove, a BRFR according to this disclosure further comprises a manifold configured to introduce a feed vertically into a bottom end of each of one or two of the at least three annulus vapor zones and remove a product from a bottom end of each of the one or two remaining of the at least three annulus vapor zones. Fixed bed BRFR 10 comprises manifold 40. Manifold 40 may be located substantially below or at a lower end of cylindrical outer housing 5. Manifold 40 comprises piping 42A, 42B, and 42C. Piping 42A, 42B, and 42C is configured for the introduction of a feed and/or the removal of a product from outer annulus vapor zone 15A, middle annulus vapor zone 15B, and central annulus vapor zone 15C, respectively. Desirably, manifold 40 can operate such that flow can be reversed. For example, piping 42B may initially be utilized for introduction of feed into middle annulus vapor zone 15B, while piping 42A is utilized to remove product from outer annulus vapor zone 15A, and piping 42C is utilized to remove product from central annulus vapor zone 15C. Subsequently (e.g., without limitation, during regeneration or reactor cleaning when removal of coke, byproducts of reaction and contaminants or the addition of regeneration fluids can be improved by reversing the process flow through the catalyst beds), flow may be reversed, with piping 42A and 42C utilized to introduce feed or other gas into outer annulus vapor zone 15A and central annulus vapor zone 15C, respectively, while piping 42B is utilized for removal of product or other gas from middle annulus vapor zone 15B.

Manifold 40 may further comprise side piping 43 configured for the combined removal of gas from piping 42A, or 42B. For example, in the embodiment of FIG. 2A, side piping 43 (which may or may not be aligned vertically along a side of fixed bed BRFR 10) fluidly connects with piping 42A and piping 42C, whereby gas (e.g., product gas) removed via same may be combined and removed from fixed bed BRFR 10.

As noted hereinabove, for fixed bed or basket BRFRs, one or more drain port(s) may be configured for the removal of catalyst from the at least two catalyst zones. For example, in the embodiment of FIG. 2A, drain ports 44A and 44C are fluidly connected with outer catalyst zone 20A, and drain port 44B is fluidly connected with inner catalyst zone 20B. Valves may be configured to control the amount of flow into and/or out of piping 42A, 42B, and 42C, between piping 42A and piping 42B, between piping 42B and piping 42C, between piping 42A and side piping 43, and between piping 42C and side piping 43. For example, valve A may be positioned along piping 42A where it connects with side piping 43, and operable to control the amount of flow along piping 42A (e.g., toward or away from the body of fixed bed BRFR 10); valve B may be positioned along piping 42C where it connects with side piping 43, and operable to control the amount of flow along piping 42C (e.g., toward or away from the reactor body); valve AA may be positioned to bypass valve A, and operable to control a small amount of flow between piping 42A and side piping 43; and valve BB may be positioned to bypass valve B (e.g., no longer trying to reverse flow during the run, but providing a small flow so the zone is not stagnant), and operable to control a small amount of flow between piping 42C and side piping 43.

Fixed bed BRFR 10 may further comprise a removable head cover 30 configured to seal a top of the reactor. Head cover 30 can be fixably coupled to reactor flange 6 at the top of cylindrical outer housing 5. Head cover 30 comprises an upper dome 31, and a head flange 32, which may be fixably coupled as known to those of skill in the art to a reactor flange 6 at the top of cylindrical outer housing 5. In embodiments, head flange 32 of head cover 30 is bolted to reactor flange 6.

Figure 2B:
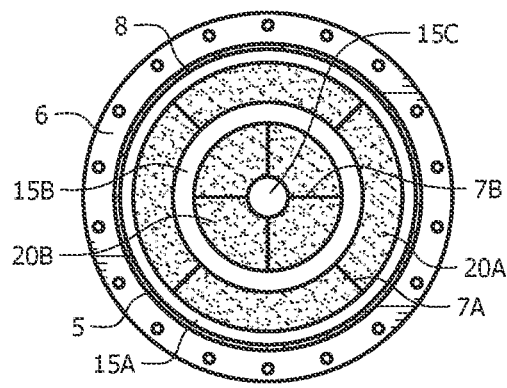
FIG. 2B depicts a downward view at the top of cylindrical outer housing 5 of fixed bed BRFR 10 of FIG. 2A.
Figure 2A:
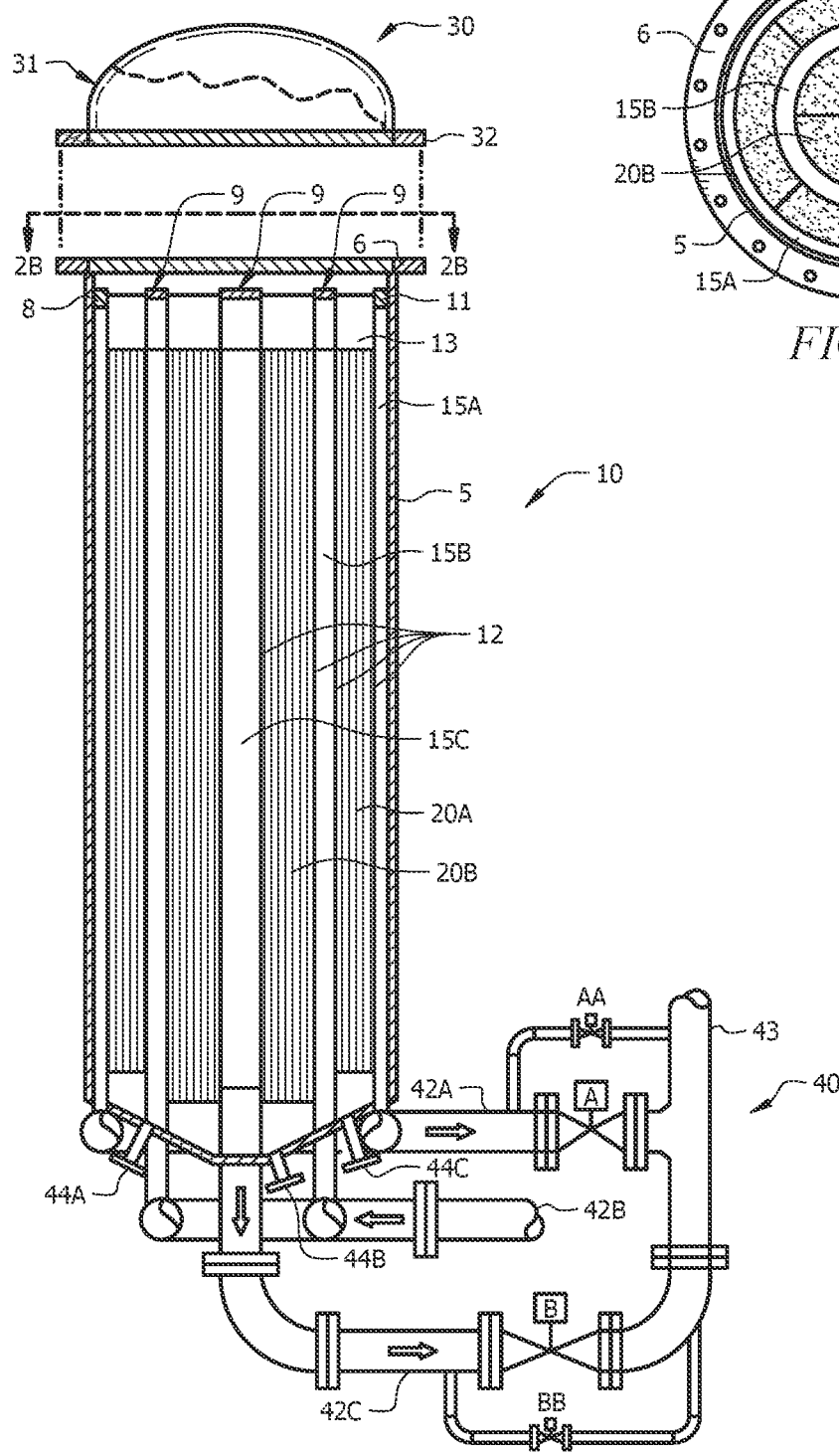
FIG. 2A is a schematic of a bi-modal radial flow reactor according to an embodiment of this disclosure.

FIG. 2B depicts a downward view at the top of cylindrical outer housing 5 of fixed bed BRFR 10 of FIG. 2A. FIG. 2B clearly depicts the intercalation of outer catalyst zone 20A with outer annulus vapor zone 15A and middle annulus vapor zone 15B, and the intercalation of inner catalyst zone 20B with middle annulus vapor zone 15B and central annulus vapor zone 15C. FIG. 2B also shows how reactor flange 6 fixably coupled with cylindrical outer housing 5 can be bolted with head flange 32 of head cover 30. Supports 7A and 7B can be integral to outer catalyst zone 20A and inner catalyst zone 20B, and configured to provide structure/support thereto. In embodiments, supports 7A and/or 7B can be absent.

Packing 8 may be positioned around a ring groove of outer catalyst zone 20A. Such packing 8 may comprise high temperature insulation, such as, without limitation ceramic fiber insulation in rope or blanket form. Kaowool® is an example of a ceramic fiber insulation available from Morgan Thermal Ceramics. A circumferential alignment spacer ring 11 may serve as a flow restrictor for outer annulus vapor zone 15A. Spacer ring 11 may be shell welded in place, or affixed as otherwise apparent to those of skill in the art. Inner caps 9 located at the top of the middle and central annulus zones may be made of similar or compatible metallurgy as the screens and catalyst baskets and may be bolted or welded thereto. A solid metal plate 11 can be utilized to align the catalyst baskets within reactor 10. An outer cap can be welded to outer housing 5 and Kaowool to allow for expansion of the catalyst baskets.

As noted hereinabove, in embodiments, a BRFR of this disclosure comprises a removable bed or removable catalyst basket of catalyst. A removable bed BRFR according to an embodiment of this disclosure will now be provided with reference to FIG. 3A. As noted hereinabove, in embodiments, a BRFR of this disclosure comprises a cylindrical outer housing surrounding at least five cylindrical, concentric zones, including at least three annulus vapor zones and at least two catalyst zones. Removable catalyst basket BRFR 110 comprises cylindrical outer housing or reactor body 105 surrounding five cylindrical, concentric zones, including three annulus vapor zones and two catalyst zones. The two catalyst zones comprise outer catalyst zone 120A and inner catalyst zone 120B, and the three annulus vapor zones comprise outer annulus vapor zone 115A, middle annulus vapor zone 115B, and central annulus vapor zone 115C. Outer catalyst zone 120A is intercalated with outer annulus vapor zone 115A and middle annulus vapor zone 115B, and inner catalyst zone 120B is intercalated with middle annulus vapor zone 115B and central annulus vapor zone 115C.

Figure 4A:
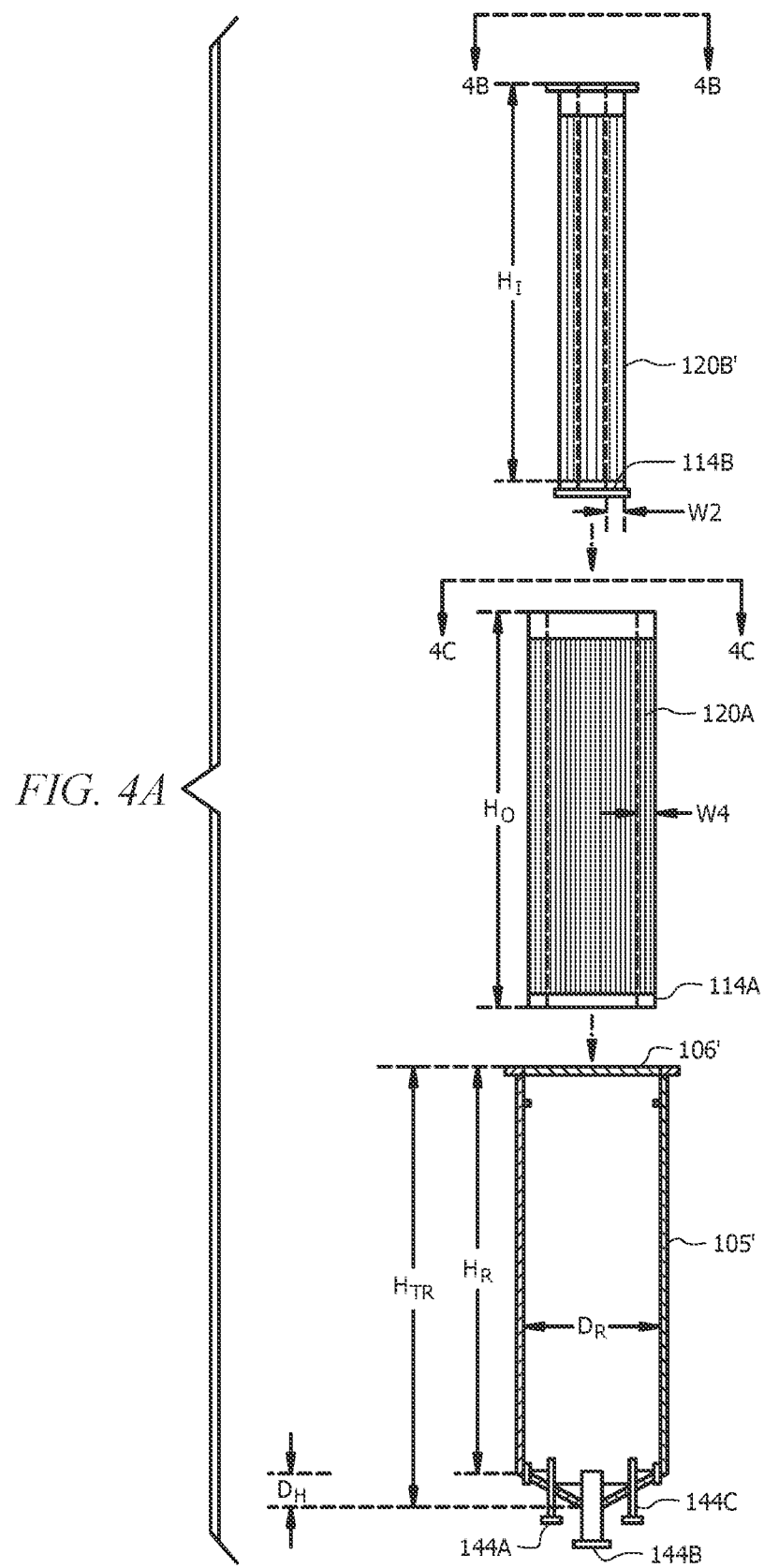
FIG. 4A is a schematic of an inner catalyst basket 120B', an outer catalyst basket 120A', and a cylindrical outer housing or reactor body 105', according to embodiments of this disclosure.
Figure 4B:
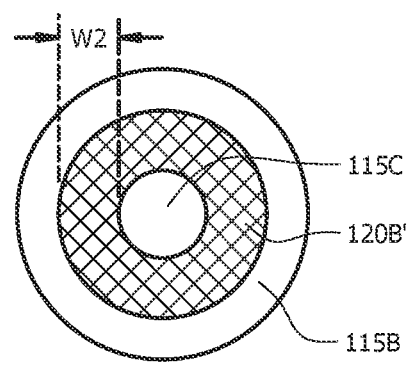
FIG. 4B is a view looking down into inner catalyst basket 120B' of FIG. 4A.
Figure 4C:
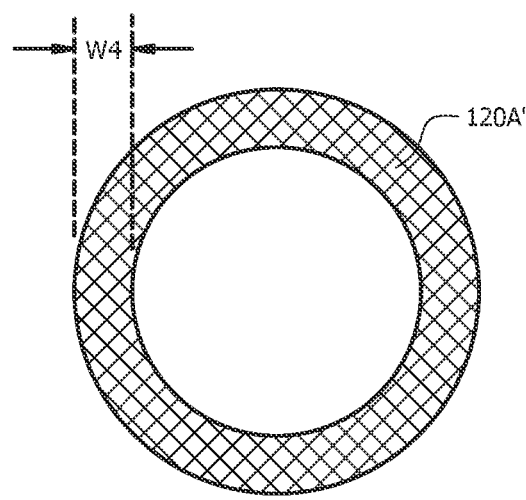
FIG. 4C is a downward view looking down into outer catalyst basket 120A of FIG. 4A.

Outer catalyst zone 120A and inner catalyst zone 120B of removable catalyst basket BRFR 110 may be provided as catalyst baskets. The catalyst baskets may be extractable from the BRFR via a top end thereof. FIG. 4A is a schematic of an inner catalyst basket 120B', an outer catalyst basket 120A', and a cylindrical outer housing or reactor body 105', according to embodiments of this disclosure, providing details of the removable catalyst baskets, reactor flange 106' is also indicated. FIG. 4B is a view looking down into inner catalyst basket 120B' of FIG. 4A. FIG. 4C is a downward view looking down into outer catalyst basket 120A of FIG. 4A. The catalyst baskets 120A/120A' may be made of Vee-Wire® screens, wedge wire screens, or any appropriate wire screens which separate the two or more catalyst zones from the three or more annulus vapor zones. Perforated metal plate 114B may be located at the bottom of inner catalyst basket 120B/120B'; perforated metal plate 114A may be located at the bottom of outer catalyst basket 120A/120A'.

In embodiments, outer catalyst zone 120A/120A' and inner catalyst zone 120B/120B' comprise reforming catalyst. The reforming catalyst may be any suitable reforming catalyst known to those of skill in the art. In embodiments, the reforming catalyst is one as described in detail hereinbelow. Perforated plates 112 may be utilized to set the pressure drop.

As noted hereinabove with reference to fixed bed BRFR 10, a BRFR according to this disclosure further comprises a manifold configured to introduce a feed vertically into a bottom end of each of one or two of the at least three annulus vapor zones, and remove a product from a bottom end of each of the one or two remaining of the at least three annulus vapor zones. Removable catalyst basket BRFR 110 comprises manifold 140. Manifold 140 may be located substantially below or at a lower end of cylindrical outer housing 105. Manifold 140 comprises piping 142A, 142B, and 142C. Piping 142A, 142B, and 142C is configured for the introduction of a feed and/or the removal of a product from outer annulus vapor zone 115A, middle annulus vapor zone 115B, and central annulus vapor zone 115C, respectively. Desirably, manifold 140 can operate such that flow can be reversed. For example, piping 142B may initially be utilized for introduction of feed into middle annulus vapor zone 115B, while piping 142A is utilized to remove product from outer annulus vapor zone 115A, and piping 142C is utilized to remove product from central annulus vapor zone 115C. Subsequently (e.g., without limitation, during regeneration or reactor cleaning when removal of coke, byproducts of reaction and contaminants or the addition of regeneration fluids can be improved by reversing the process flow through the catalyst beds), flow may be reversed, with piping 142A and 142C utilized to introduce feed or other gas into outer annulus vapor zone 115A and central annulus vapor zone 115C, while piping 142B is utilized for removal of product or other gas from middle annulus vapor zone 115B.

Manifold 140 may further comprise side piping 143 configured for the combined removal of gas from piping 142A, 142B, and/or 142C. For example, in the embodiment of FIG. 3A, side piping 143 (which may or may not be aligned vertically along a side of reactor 110) fluidly connects with piping 142A and piping 142C, whereby gas (e.g., product gas) removed via same may be combined and removed from reactor 110.

As noted hereinabove with reference to fixed bed BRFR 10 of FIG. 2A, in removable catalyst basket BRFRs, valves may be configured to control the amount of flow into and/or out of piping 142A, 142B, and 142C, between piping 142A and piping 142B, between piping 142B and piping 142C, between piping 142A and side piping 143, and between piping 142C and side piping 143. For example, valve A may be positioned along piping 142A where it connects with side piping 143, and operable to control the amount of flow along piping 142A (e.g., toward or away from the body of reactor 110); valve B may be positioned along piping 142C where it connects with side piping 143, and operable to control the amount of flow along piping 142C (e.g., toward or away from the reactor body 105); valve AA may be positioned as a bypass between piping 142A and side piping 143, and operable to control an amount of flow therebetween; and valve BB may be positioned as a bypass between piping 142C and side piping 143, and operable to control an amount of flow therebetween.

Removable catalyst basket BRFR 110 may further comprise a removable head cover 130 configured to seal a top of the reactor. Head cover 130 can be fixably coupled to cylindrical outer housing 105 via head flange 132 and reactor flange 106. Head cover 130 comprises an upper dome 131, and a head flange 132, which may be fixably coupled as known to those of skill in the art to a reactor flange 106 at the top of cylindrical outer housing 105. In embodiments, head flange 132 of head cover 130 is bolted to reactor flange 106. Head cover 130 may comprise a pressure cover plate 133A and a pressure cover plate 133B. When reactor 110 is closed, pressure cover plate 133A may align with the top of the inner central annulus vapor zone 115C. In a similar manner, when reactor 110 is closed, pressure cover plate 133B may align with an opening at the top of middle annulus vapor zone 115B. FIG. 3B is a downward view of the underside of head cover 130, showing head flange 132, pressure cover plate 133A, pressure cover plate 133B, and support structure 109A/B. Support structure 109A and support structure 109B are configured to affix pressure cover plates 133A and 133B, respectively, to head cover 130 via springs 134A and 134B, respectively.

Figure 3A:
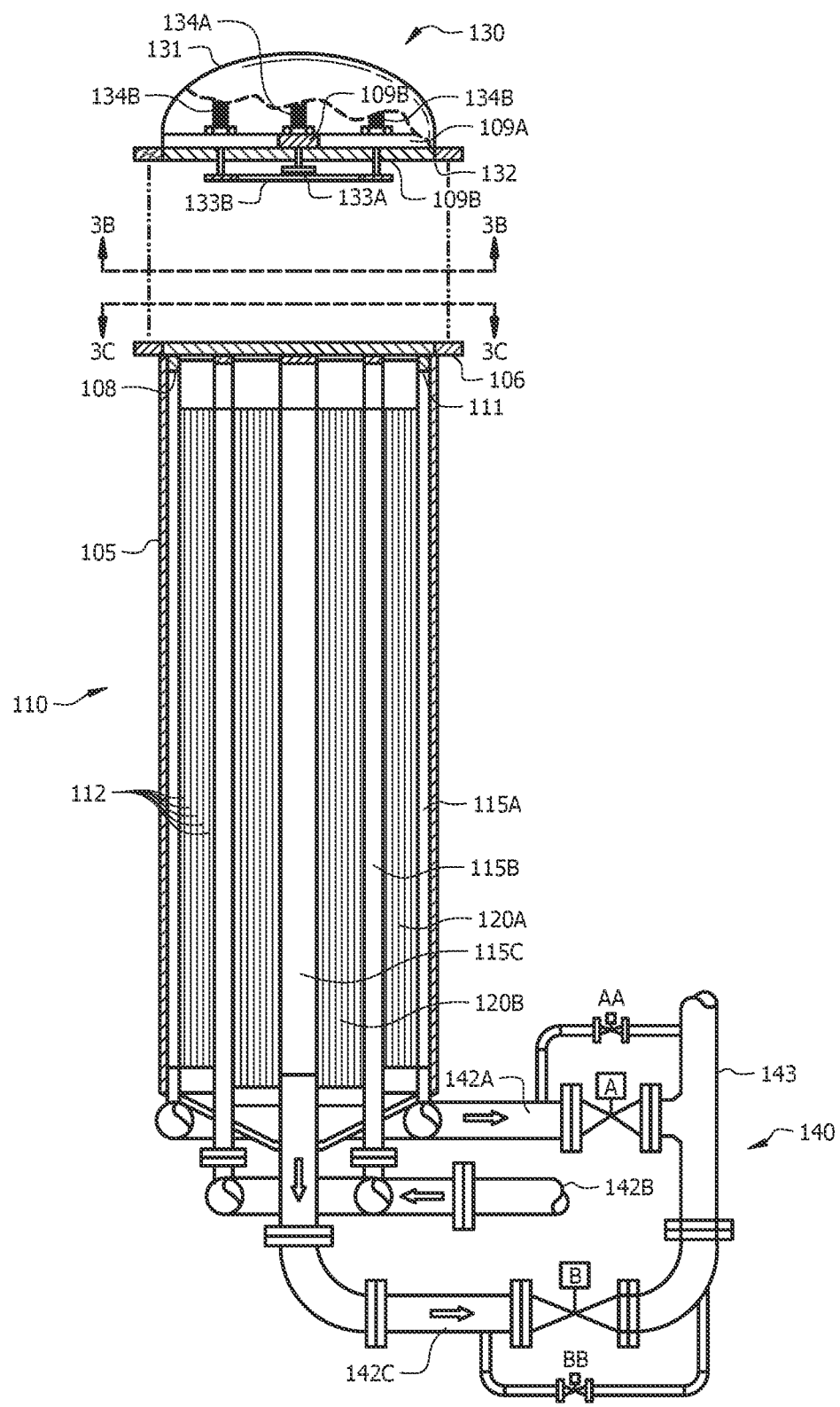
FIG. 3A is a schematic of a bi-modal radial flow reactor according to another embodiment of this disclosure.
Figure 3B:
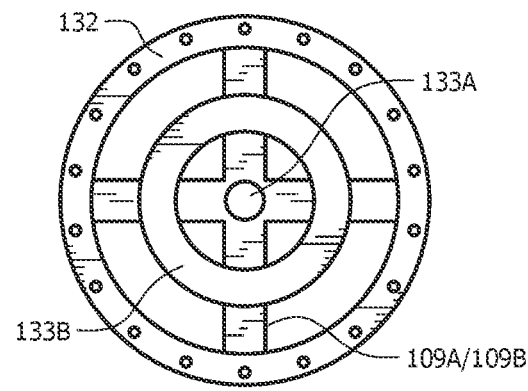
FIG. 3B is a downward view of the underside of head cover 130, showing head flange 132, pressure cover plate 133A, pressure cover plate 133B, and support structure 109A/B.
Figure 3C:
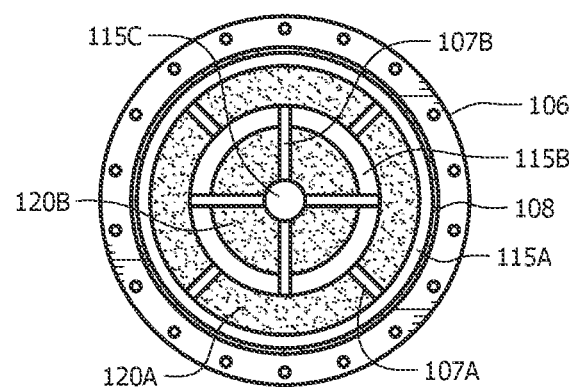
FIG. 3C depicts a downward view of the top of cylindrical outer housing 105 of reactor 110 of FIG. 3A.

FIG. 3C depicts a downward view of the top of cylindrical outer housing 105 of reactor 110 of FIG. 3A. FIG. 3C clearly depicts the intercalation of outer catalyst zone 120A with outer annulus vapor zone 115A and middle annulus vapor zone 115B, and the intercalation of inner catalyst zone 120B with middle annulus vapor zone 115B and central annulus vapor zone 115C. FIG. 3C also shows how reactor flange 106 fixably coupled with cylindrical outer housing 105 can be bolted with head flange 132 of head cover 130. Supports 107A and 107B can be integral to outer catalyst basket 120A and inner catalyst basket 120B, and configured to provide structure/support thereto.

Packing 108 may be positioned around a ring groove of outer catalyst zone 120A and between a circumferential alignment spacer ring 111. Such packing 108 may comprise high temperature insulation, such as, without limitation ceramic fiber insulation in rope or blanket form. Kaowool® is an example of a ceramic fiber insulation available from Morgan Thermal Ceramics. A circumferential alignment spacer ring 111 along with packing 108 may serve as a flow restrictor for outer annulus vapor zone 115A. The circumferential spacer alignment ring 111 may be shell welded in place, or affixed as otherwise apparent to those of skill in the art. No inner cap 9 is needed at the top of the central annulus zone 115C, as the cap is provided by 133A. A solid metal plate 111 can be utilized to align the catalyst baskets within reactor 110. An outer cap can be welded to outer housing 105 and Kaowool to allow for expansion of the catalyst baskets.

As noted hereinabove, also disclosed herein is a bi-modal radial flow guard bed reactor or 'BRFGBR'. The BRFGBR comprises a cylindrical outer housing or reactor body surrounding at least five cylindrical, concentric zones, including at least two annulus vapor zones, at least two catalyst zones, and a bed separation zone. The at least two catalyst zones comprise an outer catalyst zone and an inner catalyst zone, and the at least two annulus vapor zones comprise an outer annulus vapor zone and a central annulus vapor zone. The outer catalyst zone is intercalated with the outer annulus vapor zone and the bed separation zone, and the inner catalyst zone is intercalated with the bed separation zone and the central annulus vapor zone. Thus, one of the at least three annulus vapor zones of the BRFR is replaced with a bed separation zone in the BRFGBR. The BRFGBR further comprises a manifold configured to introduce a feed vertically into a bottom end of the outer annulus vapor zone, and remove a product from a bottom end of the central annulus vapor zone, and may be operable to reverse this flow.

Figure 5A:
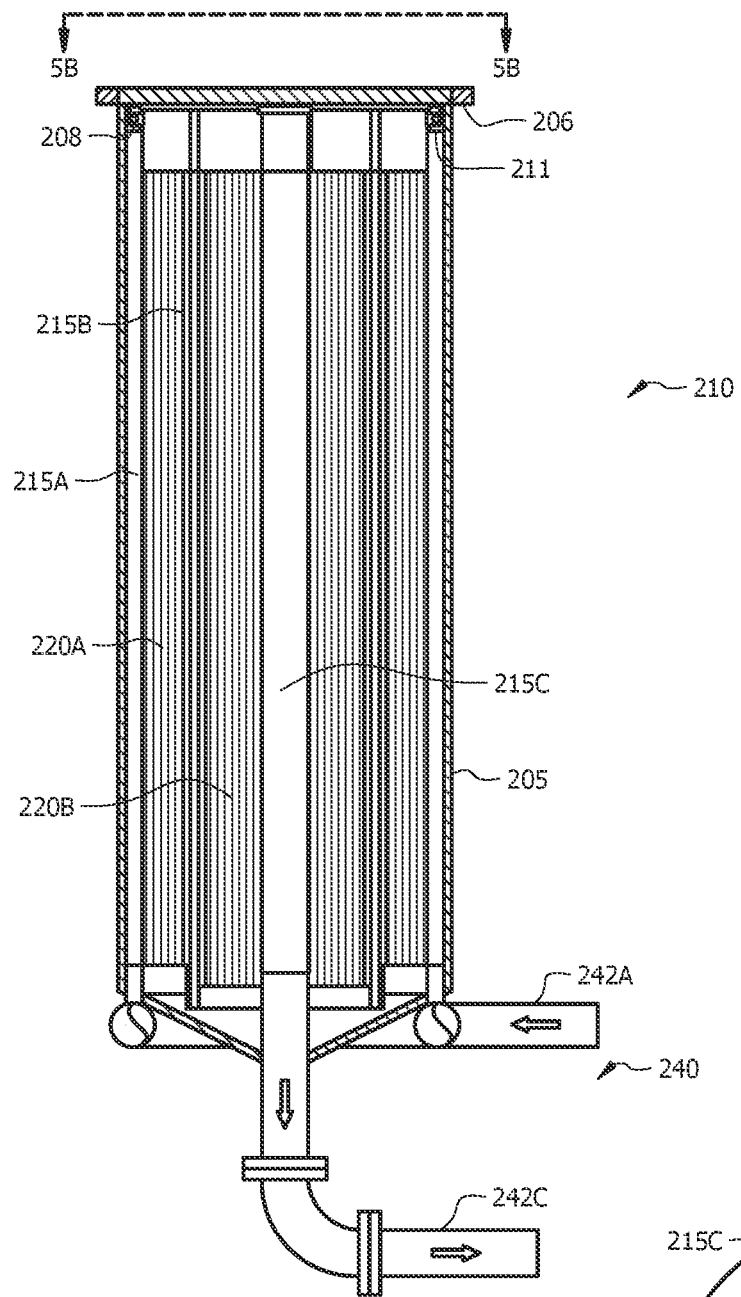
FIG. 5A is a schematic of a bi-modal radial flow guard bed reactor according to an embodiment of this disclosure.

A bi-modal radial flow guard bed reactor according to an embodiment of this disclosure will now be provided with reference to FIG. 5A. BRFGBR 210 comprises a cylindrical outer housing or reactor body 205 surrounding outer catalyst zone 220A and inner catalyst zone 220B, outer annulus vapor zone 215A and central annulus vapor zone 215C, and bed separation zone 215B. As with fixed bed BRFR 10 and removable catalyst basket BRFR 110, the at least two catalyst zones comprise outer catalyst zone 220A and inner catalyst zone 220B. The annulus vapor zones of BRFGBR 210 comprise an outer annulus vapor zone 215A, a bed separation zone 215B, and a central annulus vapor zone 215C (215C may be a solid perforated pipe, which the inner catalyst Vee-Wire® screen basket 220B is inserted/installed over). Outer catalyst zone 220A is intercalated with outer annulus vapor zone 215A and bed separation zone 215B, and inner catalyst zone 220B is intercalated with bed separation zone 215B and central annulus vapor zone 215C. Bed separation zone 215B comprises a bed separation basket, which may be provided, for example, by a Vee-Wire® screens, wedge wire screens, or any appropriate wire screen.

Outer and inner catalyst zones 220A and 220B, respectively, of BRFGBR 210 may be provided as removable catalyst baskets, similar to (although likely smaller than) those of removable catalyst basket BRFR 110. Thus, the removable catalyst baskets may be extractable from the BRFGBR via a top end thereof, and substantially as described with regard to FIG. 3 and FIGS. 4A-4C.

As with fixed bed BRFR 10 and removable catalyst basket BRFR 110, a BRFGBR according to this disclosure further comprises a manifold. In the embodiment of FIG. 5A, manifold 240 is configured to introduce a feed vertically into a bottom end of outer annulus vapor zone 215A, and remove a product from a bottom end of central annulus vapor zone 215C. Manifold 240 may be located substantially below or at a lower end of cylindrical outer housing 205. Manifold 240 comprises piping 242A and 242C. Piping 242A and 242C is configured for the introduction of a feed and/or the removal of a product from outer annulus vapor zone 215A and central annulus vapor zone 215C, respectively. Desirably, manifold 240 can operate such that flow can be reversed. For example, piping 242A may initially be utilized for introduction of feed into outer annulus vapor zone 215A, while piping 242C is utilized to remove product from central annulus vapor zone 215C. Subsequently (e.g., without limitation, during regeneration or reactor cleaning when removal of coke, byproducts of reaction and contaminants or the addition of regeneration fluids can be improved by reversing the process flow through the catalyst beds), flow may be reversed, with piping 242C utilized to introduce feed or other gas into central annulus vapor zone 215C, while piping 242A is utilized for removal of product or other gas from outer annulus vapor zone 215A. As described with the embodiments of FIGS. 2 and 3, BRFGBR 210 may further comprise side piping 243, manifold 240, a head cover 230, packing 208 shown in FIG. 5A, a circumferential alignment spacer ring 211 shown in FIG. 5A, and/or supports 207A and 207B shown in FIG. 5B.

Figure 5B:
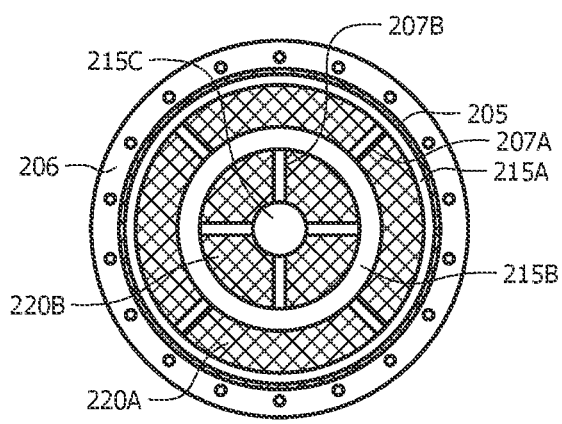
FIG. 5B depicts a downward view of the top of cylindrical outer housing 205 of reactor 210 of FIG. 5A.
Figure 6:
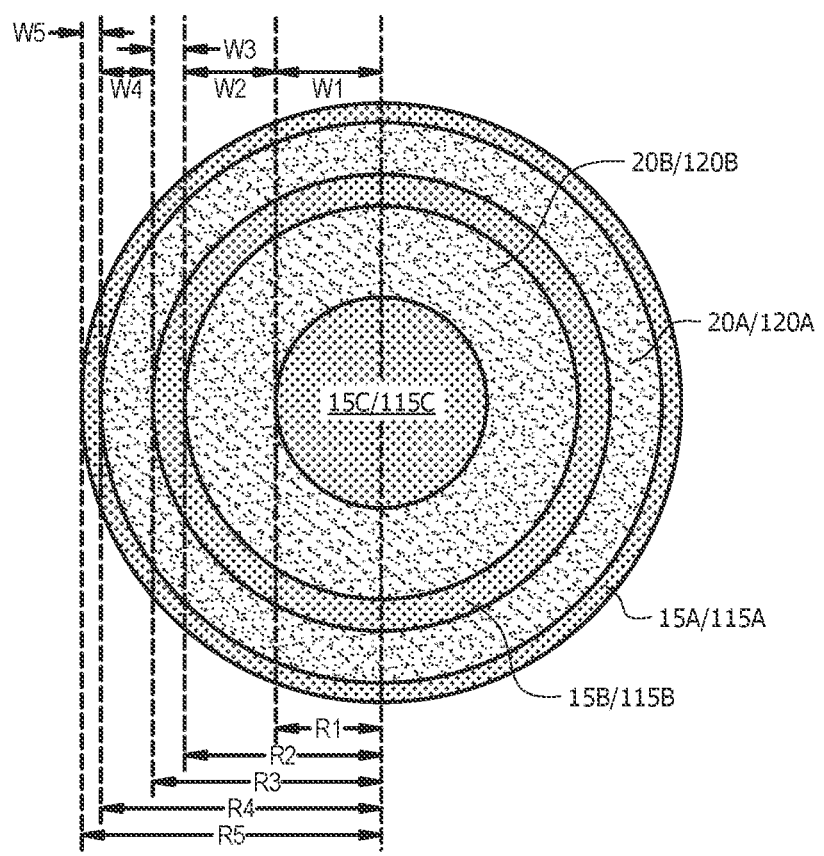
FIG. 6 is a schematic of a top view of a bi-modal radial flow reactor according to embodiments of this disclosure.

FIG. 5B depicts a downward view of the top of cylindrical outer housing 205 of reactor 210 of FIG. 5A. FIG. 5B clearly depicts the intercalation of outer catalyst zone 220A with outer annulus vapor zone 215A and bed separation zone 215B, and the intercalation of inner catalyst zone 220B with bed separation zone 215B and central annulus vapor zone 215C. FIG. 5B also shows how reactor flange 206 fixably coupled with cylindrical outer housing 205 can be bolted with the head flange of a head cover (e.g., such as head cover 30 via head flange 32 in FIG. 2A).

In embodiments, a BRFGBR of this disclosure comprises reforming catalyst (e.g., a reforming catalyst as known to those of skill in the art or provided hereinbelow) in inner catalyst zone 220B and outer catalyst zone 220A. In embodiments, a BRFGBR of this disclosure comprises reforming catalyst (e.g., a reforming catalyst as known to those of skill in the art or provided hereinbelow) in inner catalyst zone 220B, and a different catalyst in outer catalyst zone 220A. In embodiments, inner catalyst zone 220B comprises a reforming catalyst (e.g., a reforming catalyst as known to those of skill in the art or provided hereinbelow), a sulfur adsorber media, or both. In embodiments, outer catalyst zone 220A comprises an iron trap media. Such sulfur adsorber media and iron trap media are known to those of skill in the art.

Most of the following dimensions will be provided with reference to FIGS. 4A-4C and FIG. 6, which is a schematic of a top view of a bi-modal radial flow reactor 10/110 according to embodiments of this disclosure. In embodiments, central annulus vapor zone 15C/115C/215C has a radius or width $R_1=W_1$ in the range of from about 1 feet (0.30 meter (m)) to about 2 feet (0.61 m), from about 1.5 feet (0.46 m) to about 2 feet (0.61 m), or from about 0.5 foot (0.15 m) to about 2 feet (0.61 m).

In embodiments, inner catalyst zone or inner catalyst basket 20B/120B/120B'/220B has a width or thickness of catalyst $W_2$ in the range of from about 0.5 foot (0.15 m) to about 2 feet (0.61 m), from about 1.5 feet (0.46 m) to about 2 feet (0.61 m), or from about 1 foot (0.30 m) to about 3 feet (0.91 m). In embodiments, inner catalyst zone or inner catalyst basket 20B/120B/120B'/220B has an outer radius $R_2$ that is substantially equal to $R_1+W_2$. In embodiments, inner catalyst zone or inner catalyst basket 20B/120B/120B'/220B has an outer radius $R_2$ in the range of about 2 feet (0.61 m) to about 4 feet (1.22 m), from about 3.5 feet (1.07 m) to about 4 feet (1.22 m), or from about 1.5 feet (0.46 m) to about 4 feet (1.22 m), and an inner radius substantially equivalent to $R_1$. In embodiments, inner catalyst zone or inner catalyst basket 20B/120B/120B'/220B has a height of catalyst $H_I$ in the range of from about 10 feet (3.05 m) to about 40 feet (12.19 m), 10 feet (3.05 m) to about 50 feet (15.24 m), or from about 5 feet (1.52 m) to about 50 feet (15.24 m).

In embodiments, middle annulus vapor zone 15B/115B or bed separation zone 215B has a width or thickness of catalyst $W_3$ in the range of from about 0.5 foot (0.15 m) to about 1.5 feet (0.46 m), from about 0.75 foot (0.23 m) to about 1.25 feet (0.38 m), or from about 0.25 foot (0.08 m) to about 2 feet (0.91 m). In embodiments, middle annulus vapor zone 15B/115B or bed separation zone 215B has an outer radius $R_3$ that is substantially equal to $R_2+W_3$. In embodiments, $R_3$ is in the range of from about 2.25 feet (0.68 m) to about 6 feet (1.83 m), from about 2.5 feet (076 m) to about 5.5 feet (1.68 m), or from about 2.75 foot (0.84 m) to about 5.25 feet (1.60 m), and an inner radius substantially equivalent to $R_2$.

In embodiments, outer catalyst basket 20A/120A/120A'/220A has a width or thickness of catalyst $W_4$ in the range of from about 0.75 foot (0.23 m) to about 1.75 feet (0.53 m), from about 1 foot (0.30 m) to about 1.5 feet (0.46 m), or from about 1 foot (0.30 m) to about 1.75 feet (0.53 m). In embodiments, outer catalyst basket 20A/120A/120A'/220A has an outer radius $R_4$ that is substantially equal to $R_3+W_4$. In embodiments, outer catalyst basket 20A/120A/120A'/220A has an outer radius $R_4$ in the range of from about 3.25 feet (0.99 m) to about 7.5 feet (2.29 m), from about 3.25 feet (0.99 m) to about 7.75 feet (2.36 m), or from about 3 feet (0.91 m) to about 7.25 feet (2.21 m), and an inner radius substantially equivalent to $R_3$. In embodiments, outer catalyst basket 20A/120A/120A'/220A has a height of catalyst $H_O$ in the range of from about 10 feet (3.05 m) to about 40 feet (12.19 m), 10 feet (3.05 m) to about 50 feet (15.24 m), or from about 5 feet (1.52 m) to about 50 feet (15.24 m).

In embodiments, outer annulus vapor zone 15A/115A/215A has a width or thickness $W_5$ in the range of from about 0.25 foot (0.08 m) to about 2 feet (0.61 m), from about 0.50 foot (0.15 m) to about 1.25 feet (0.38 m), or from about 0.75 foot (0.23 m) to about 1.0 feet (0.31 m). In embodiments, outer annulus vapor zone 15A/115A/215A has an outer radius $R_5$ that is substantially equal to $R_4+W_5$. In embodiments, outer annulus vapor zone 15A/115A/215A has an outer radius $R_5$ substantially equivalent to $\frac{1}{2} D_R$, and an inner radius substantially equivalent to $R_4$. In embodiments, outer annulus vapor zone 15A/115A/215A has an outer radius $R_5$ in the range of from about 3.00 feet (1.07 m) to about 10 feet (3.05 m), from about 3.5 feet (1.07 m) to about 9 feet (2.74 m), or from about 3.75 feet (1.14 m) to about 10 feet (3.05 m).

In embodiments, cylindrical outer housing or reactor body 5/105/105'/205 has an inner diameter $D_R$, and a radius equal to ½ $D_R$ that is in the range of from about 3 feet (0.91 m) to about 10 feet (3.05 m), from about 3 feet (0.91 m) to about 10 feet (3.05 m), or from about 4 feet (1.22 m) to about 9 feet (2.74 m). In embodiments, cylindrical outer housing or reactor body 5/105/105'/205 has a height of vertical wall $H_R$ in the range of from about 10 feet (3.05 m) to about 40 feet (12.19 m), 10 feet (3.05 m) to about 50 feet (15.24 m), or from about 5 feet (1.52 m) to about 50 feet (15.24 m), and a total vertical height $H_{TR}$ equal to $H_R$ plus ΔH, where ΔH is in the range of from about 0.5 inch (0.01 m) to about 6 inches (0.15 m), from about 1 inch (0.02 m) to about 1 foot (0.31 m), or from about 0.5 inch (0.01 m) to about 1 foot (0.31 m).

In an embodiment, the outer catalyst zone 20A/120A/120A'/220A comprises a volume of catalyst that is about equal to the volume of catalyst in the inner catalyst zone 20B/120B/120B'/220B. In an embodiment, two or more of the outer annulus vapor zone 15A/115A, the middle annulus vapor zone 15B/115B, and/or the central annulus vapor zone 15C/115C have a same or a similar volume (e.g., ±1, 2, 3, 4, 5, 6, 7, 8, 9, 10, 11, 12, 13, 14, 15, 16, 17, 18, 19, or 20%).

In embodiments, the BRFR is a taller reactor (e.g., having a reactor height $H_R$ of greater than or equal to about 20, 30, or 40 feet (6.1, 9.1, or 12.2 m) with a smaller diameter (e.g., having a reactor diameter $D_R$ of less than or equal to about 6, 7, or 8 feet (1.8, 2.1, or 2.4 m), which may facilitate lower pressure drop operation. (As discussed further hereinbelow, utilization of differing diameter catalyst pellets in the different catalyst zones may also serve to decrease pressure drop buildup.) In alternative embodiments, the BRFR is a larger diameter reactor (e.g., having a reactor diameter $D_R$ of greater than or equal to about 20, 30, or 40 feet (6.1, 9.1, or 12.2 m) having larger volumes of catalyst in outer catalyst zone or outer catalyst basket 20A/120A/120A'/220A and/or inner catalyst zone or inner catalyst basket 20B/120B/120B'/220B. Such larger total inventory of catalyst may facilitate longer run lengths. Such longer run lengths may comprise catalyst cycles greater than or equal to 3, 4, or 5 years.

As noted hereinabove, radial flow reactors of this disclosure may be suitable for use with a variety of catalysts, as known to those of ordinary skill in the art. In embodiments, a BRFR of this disclosure is utilized to carry out an endothermic reaction. In embodiments, the BRFR is utilized to carry out reforming reactions. In embodiments, outer catalyst zone 20A/120A/120A'/220A, inner catalyst zone 20B/120B/120B'/220B, or both contain a reforming catalyst. In embodiments, inner catalyst zone 20B/120B/120B'/220B comprises a catalyst that is different from a catalyst in outer catalyst zone 20A/120A/120A'/220A in at least one parameter selected from the group consisting of size, shape, composition, and loading. Incorporation of different catalyst may enable control of a pressure drop across the inner catalyst zone, the outer catalyst zone, or both. In embodiments, a pressure drop across the inner catalyst zone 20B/120B/120B'/220B is the same or substantially the same as (e.g., within ±1, 2, 3, 4, 5, 6, 7, 8, 9, 10, 11, 12, 13, 14, 15, 16, 17, 18, 19, or 20% of) the pressure drop across the outer catalyst zone 20A/120A/120A'/220A.

In embodiments, the reforming catalyst is an AROMAX® Catalyst, as described, for example, in U.S. Pat. No. 9,085,736. The reforming catalyst may comprise an inorganic support, a group VIII metal such as platinum, and one or more halides such as fluorine, chlorine, iodine, bromine, or combinations thereof. In some embodiments, the catalyst may comprise Group VIII metals on an inorganic support such as platinum on alumina, Pt/Sn on alumina and Pt/Re on alumina. In other embodiments, the catalyst may comprise Noble Group VIII metals on a zeolitic support such as Pt, Pt/Sn and Pt/Re on zeolitic supports which may comprise a binder and zeolites such as L-zeolites, ZSM-5, silicalite and beta; and Noble Group VIII metals on alkali- and alkaline-earth exchanged L-zeolites. The catalyst may comprise a large-pore zeolite as the inorganic support, charged with at least one Group VIII metal. In embodiments, the Group VIII metal may comprise platinum, which may be more selective for dehydrocyclization and which may be more stable under reforming reaction conditions than other Group VIII metals. In other embodiments, the catalyst may comprise a Group VIII metal such as rhenium, or a Group IV metal or metalloid such as tin.

In an embodiment, the catalyst may comprise a non-acidic catalyst which may comprise a non-acidic zeolite support as the inorganic support, a group VIII metal, and one or more halides. Suitable halides include chloride, fluoride, bromide, iodide, or combinations thereof. Suitable Group VIII metals include iron, cobalt, nickel, ruthenium, rhodium, palladium, osmium, iridium, platinum, or combinations thereof.

Inorganic supports for reforming catalysts (e.g., aromatization catalysts) can generally include any inorganic oxide. These inorganic supports include bound large pore aluminosilicates (zeolites), amorphous inorganic oxides and mixtures thereof. Large pore aluminosilicates include, but are not limited to, L-zeolite, Y-zeolite, mordenite, omega zeolite, beta zeolite and the like. Amorphous inorganic oxides include, but are not limited to, aluminum oxide, silicon oxide and titania. Suitable bonding agents for the inorganic supports include, but are not limited to, silica, alumina, clays, titania, magnesium oxide, and combinations thereof.

The inorganic support may be an aluminosilicate, for example a zeolite. In embodiments, the reforming catalyst may comprise a zeolitic catalyst. Zeolite materials, both natural and synthetic, are known to have catalytic properties for many hydrocarbon processes. The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. The cavities and channels throughout the crystalline material of zeolites are interconnected and generally can be of a size to allow selective separation of hydrocarbons. In the three-dimensional framework, the ratio of oxygen atoms to the total of aluminum and silicon atoms may be equal to 2. The framework exhibits a negative electrovalence that typically is balanced by the inclusion of cations within the crystal such as metals, alkali metals, alkaline earth metals, or hydrogen. Thus, zeolites are a group of natural or synthetic hydrated aluminosilicate minerals that typically contain alkali and alkaline metals. Zeolites are characterized by a framework structure that encloses interconnected cavities occupied by ion-exchangeable large metal cations such as potassium and water molecules permitting reversible dehydration. The actual formula of the zeolite may vary without changing the crystalline structure. In an embodiment, the mole ratio of silicon to aluminum (Si/Al) in the zeolite may vary from about 1.0 to about 3.5.

In embodiments, the reforming catalyst may comprise a large pore zeolite. The term "large-pore zeolite" may be defined as a zeolite having an effective pore diameter of from about 6 Angstroms (Å) to about 15 Å; alternatively, from about 7 Å to about 9 Å. Examples of large pore crystalline zeolites are type L-zeolite, zeolite X, zeolite Y, omega zeolite, beta zeolite, ZSM-4, ZSM-5, ZSM-10, ZSM-12, ZSM-20, REY, USY, RE-USY, LZ-210, LZ-210-A, LZ-210-M, LZ-210-T, SSZ-24, SSZ-26, SSZ-31, SSZ-33, SSZ-35, SSZ-37, SSZ-41, SSZ-42, SSZ-44, MCM-58, mordenite, mazzite, faujasite, and combinations thereof. In an embodiment, the large pore zeolite may comprise an isotypic framework structure. In an embodiment, the reforming catalyst may comprise L-zeolite.

L-zeolite, its X-ray diffraction pattern, its properties, and methods for its preparation are described in detail in, U.S. Pat. No. 3,216,789, the content of which is hereby incorporated by reference. Zeolite X is described in U.S. Pat. No. 2,882,244. Mazzite is described in U.S. Pat. Nos. 4,503,023 and 4,021,447. Mordenite is described in U.S. Pat. No. 4,503,023. Zeolite Y is described in U.S. Pat. No. 3,130,007. U.S. Pat. Nos. 3,216,789; 2,882,244; 4,503,023; 4,021,447; and 3,130,007, are hereby incorporated by reference to show zeolites useful for reforming processes.

In embodiments, the reforming catalyst may comprise a large pore L-zeolite. L-type zeolite catalysts are a sub-group of zeolitic catalysts. Typical L-type zeolites contain mole ratios of oxides in accordance with the following formula:

$$M_{2/n}O \cdot Al_2O_3 \cdot xSiO_2 \cdot yH_2O \quad (1)$$

wherein "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of "M", "x" may be 2 or greater; and "y" is the number of water molecules contained in the channels or interconnected voids with the zeolite.

Bound potassium L-type zeolites, or KL zeolites, have been found to be particularly desirable. The term KL zeolite as used herein refers to L-type zeolites in which the principal cation M incorporated in the zeolite may comprise potassium. A KL zeolite may be cation-exchanged or impregnated with another metal and one or more halides to produce a platinum-impregnated, halided zeolite or a KL supported Pt-halide zeolite catalyst. In an embodiment, the zeolite may comprise type L zeolite. In embodiments, the reforming catalyst may comprise a potassium L-type zeolite, hereafter referred to as KL-zeolite, which refers to L-type zeolites wherein the principal exchangeable cation M incorporated in the zeolite is potassium.

One or more Group VIII metals may be added to the catalyst support to form a metallized catalyst support. The metal may be added to the catalyst support by employing a variety of known and conventional techniques, e.g., ion-exchange, incipient wetness, pore fill, impregnation, vapor deposition etc. In embodiments, the platinum and optionally one or more halides may be added to the zeolite support by any suitable method, for example via impregnation with a solution of a platinum-containing compound and one or more halide-containing compounds. In an embodiment, the metal may be added to the catalyst support by impregnation with a metal-containing solution. The metal in the metal containing solution may comprise at least one Group VIII metal; alternatively, Pt, Pd, Rh, Ir, Ru, Os, or combinations thereof. In an embodiment, the metal may comprise platinum that may be added to the catalyst support via contact with a metal-containing solution containing at least one platinum-containing compound. Examples of suitable platinum-containing compounds for contact with the catalyst support include without limitation platinum compounds that form positively charged platinum complex ions in solution such as for example platinum salts such as chlorides and nitrates; platinum complexes with amines; or combinations thereof. For example, the platinum-containing compound can be any decomposable platinum-containing compound including, but not limited to, ammonium tetrachloroplatinate, chloroplatinic acid, diammineplatinum (II) nitrite, bis-(ethylenediamine)platinum (II) chloride, platinum (II) acetylacetonate, dichlorodiammine platinum, platinum (II) chloride, tetraammineplatinum (II) hydroxide, tetraammineplatinum chloride, and tetraammineplatinum (II) nitrate. In an embodiment, the platinum source may comprise tetraamine platinum chloride (TAPC). The amount of platinum in the metallized catalyst support may range from about 0.1 to about 5 wt %; alternatively, from about 0.1 to about 3 wt %; alternatively, from about 0.3 to about 1.8 wt %.

In an embodiment, the catalyst may comprise a large pore zeolite support with a platinum-containing compound and at least one halide. One or more halides may be added to the catalyst support by contact with a halide-containing compound to form a halided catalyst support. The halides may be added into the catalyst support separately; alternatively, the halides may be added to the catalyst support at the same time. Such halides may be incorporated during addition of a metal, alternatively, the halides may be incorporated in a separate step that may be pre- or post-addition of the metal, to form a halided, metallized catalyst support. Examples of suitable halides include without limitation fluoride, chloride, bromide, iodide, or combinations thereof. Such halides may be introduced as the ammonium halide compound.

In an embodiment, the catalyst may comprise a large pore zeolite support with a platinum-containing compound and at least one ammonium halide compound. The ammonium halide compound may comprise one or more compounds represented by the formula $N(R)_4X$, where X may comprise a halide and where R represents a hydrogen or a substituted or unsubstituted carbon chain molecule having 1-20 carbons wherein each R may be the same or different. In an embodiment, R may comprise methyl, ethyl, propyl, butyl, or combinations thereof. Examples of a suitable organic ammonium compound represented by the formula $N(R)_4X$ may include ammonium chloride, ammonium fluoride, and tetraalkylammonium halides such as tetramethylammonium chloride (TMAC), tetramethylammonium fluoride (TMAF), tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, or combinations thereof.

In an embodiment, the ammonium halide compound may comprise at least one acid halide and at least one ammonium hydroxide represented by the formula $N(R')_4OH$, where R' may comprise hydrogen or a substituted or unsubstituted carbon chain molecule having 1-20 carbon atoms wherein each R' may be the same or different. In an embodiment, R' may comprise methyl, ethyl, propyl, butyl, or combinations thereof. Examples of a suitable ammonium hydroxide represented by the formula $N(R)_4OH$ may include ammonium hydroxide, tetraalkylammonium hydroxides such as tetramethylammonium hydroxide, tetraethylammonium hydroxide, tetrapropylammonium hydroxide, tetrabutylammonium hydroxide, and combinations thereof. Examples of suitable acid halides may include HCl, HF, HBr, HI, or combinations thereof.

In an embodiment the ammonium halide compound may comprise (a) a compound represented by the formula $N(R)_4X$, where X may comprise a halide and where R represents a hydrogen or a substituted or unsubstituted carbon chain molecule having 1-20 carbons wherein each R may be the same or different, and (b) at least one acid halide and at least one ammonium hydroxide represented by the formula $N(R')_4OH$, where R' may comprise hydrogen or a substituted or unsubstituted carbon chain molecule having 1-20 carbon atoms wherein each R' may be the same or different.

The halide-containing compound may further comprise an ammonium halide such as ammonium chloride, ammonium fluoride, or both in various combinations with the ammonium halide compounds described previously. More specifically, ammonium chloride, ammonium fluoride, or both may be used with (a) as described previously, a compound represented by the formula $N(R)_4X$, where X may comprise a halide and where R represents a hydrogen or a substituted or unsubstituted carbon chain molecule having 1-20 carbons wherein each R may be the same or different and/or (b) as described previously, at least one acid halide and at least one organic ammonium hydroxide represented by the formula $N(R)_4OH$, where R' may comprise a substituted or unsubstituted carbon chain molecule having 1-20 carbon atoms wherein each R' may be the same or different. For example, a first fluoride- or chloride-containing compound can be introduced as a tetraalkylammonium halide with a second fluoride- or chloride-containing compound introduced as an ammonium halide. In an embodiment, tetraalkylammonium chloride may be used with ammonium fluoride.

In an embodiment, the reforming catalyst may comprise a metallized, halided support and the amount of halide in the catalyst ranges from about 0.05 wt % to about 5.0 wt %. In an embodiment, the halided catalyst support may comprise chloride present in an amount of from about 0.1 wt % to about 5 wt %; alternatively, from about 0.1 wt % to about 3 wt %; alternatively, from about 0.3 wt % to about 1.8 wt %. In an embodiment, the halided catalyst support may comprise fluoride present in an amount of from about 0.1 wt % to about 5 wt %; alternatively, from about 0.1 wt % to about 3 wt %; alternatively, from about 0.3 wt % to about 1.8 wt %. In an embodiment, the halided catalyst support may comprise both chloride and fluoride, which may be present in a Cl:F ratio of from about 1:10 to 10:1; alternatively, from about 1:5 to 5:1; alternatively, from about 1:2 to 2:1.

In embodiments, the catalyst may comprise a low-acidity silica-bound potassium L-type zeolite support, platinum, chloride, and fluoride. In embodiments, the reforming catalyst may readily convert near-linear $C_6$s (i.e., $C_6$ hydrocarbons with no more than one branch), but may not readily convert $C_6$ hydrocarbons having more than one branch, e.g., dimethylpentane. Such readily converted $C_6$ hydrocarbons are referred to herein as "$C_6$-convertibles". In embodiments, the reforming catalyst comprises a low-acidity silica-bound potassium L-type zeolite support, platinum, chloride, and fluoride. In embodiments, the disclosed method provides for a conversion of $C_6$-convertibles greater than about 75%; alternatively, greater than about 80%; alternatively, greater than about 83%.

Examples of catalysts and reactor systems suitable for use with the reactors, systems, and methods described herein are the AROMAX® Process and catalyst technologies available from the Chevron Phillips Chemical Company of The Woodlands, Tex. A specific example of a suitable commercially available reforming catalyst is the AROMAX® II Catalyst available from Chevron Phillips Chemical Company LP of The Woodlands, Tex. Suitable reforming catalysts are also disclosed in U.S. Pat. No. 7,153,801 to Wu entitled "Aromatization Catalyst and Methods of Making and Using Same", and U.S. Pat. No. 6,812,180 to Fukunaga entitled "Method for Preparing Catalyst", each of which are incorporated herein by reference as if reproduced in their entirety.

Also disclosed herein is a method of utilizing a BRFR according to this disclosure. In embodiments, as noted hereinabove, the BRFR is utilized in the catalytic reforming of hydrocarbons, to convert petroleum refinery naphthas distilled from crude oil (typically having low octane ratings) into high-octane liquid products or 'reformates', which are premium blending stocks for high-octane gasoline. The process converts low-octane linear hydrocarbons (paraffins) into branched alkanes (isoparaffins) and cyclic naphthenes, which are then partially dehydrogenated to produce high-octane aromatic hydrocarbons.

In embodiments, a hydrocarbon feed introduced into the BRFR (e.g., aromatization reactor) comprises non-aromatic hydrocarbons containing at least six carbon atoms. In embodiments, the hydrocarbon feed comprises a combination of hydrocarbons having from about five to about nine carbon atoms. In embodiments, the hydrocarbon feed to the BRFR comprises a mixture of hydrocarbons comprising $C_6$ to $C_8$ hydrocarbons containing up to about 10 wt % of $C_5$ and lighter hydrocarbons ($C_5^-$) by weight of the feed; alternatively, up to about 15 wt % of $C_5$ and lighter hydrocarbons ($C_5^-$), and containing up to about 10 wt % of $C_9$ and heavier hydrocarbons ($C_9^+$) by weight of the feed. Low levels of $C_9^+$ and $C_5^-$ hydrocarbons may maximize the yield of high value aromatics. Coke formation may be affected by the coke forming components, such as cyclopentane and $C9^+$ compounds, in the feed. In some embodiments, the feed maximizes the percentage of $C_6$ hydrocarbons. Such a feed can be achieved by separating a hydrocarbon feedstock, such as a full-range naphtha, into a light hydrocarbon feed fraction and a heavy hydrocarbon feed fraction, and using the light fraction in the feed. In embodiments, the feed maximizes the conversion of $C_6$-convertibles. In embodiments, the feed comprises up to about 50 wt % $C_6$-convertibles; alternatively, up to 60 wt % $C_6$-convertibles; alternatively, up to 70 wt % $C_6$-convertibles by weight of the feed.

In certain embodiments, the feed comprises naphtha. The naphtha feed may comprise a light hydrocarbon, with a boiling range of about 70° F. to about 450° F. The naphtha feed may contain aliphatic, naphthenic, or paraffinic hydrocarbons. These aliphatic and naphthenic hydrocarbons may be converted, at least in part, to aromatics in the BRFR or catalytic reactor system comprising the BRFR. While catalytic aromatization typically refers to the conversion of naphtha, other feedstocks can be treated as well to provide an aromatics-enriched product. Therefore, while the conversion of naphtha may be one embodiment, the present disclosure can be useful for the conversion or aromatization of a variety of feedstocks such as paraffin hydrocarbons, olefin hydrocarbons, acetylene hydrocarbons, cyclic paraffin hydrocarbons, cyclic olefin hydrocarbons, and mixtures thereof, and particularly saturated hydrocarbons.

In an embodiment, the feedstock may be substantially free of sulfur, nitrogen, metals, and other known poisons for reforming catalysts. In an embodiment, the hydrocarbon stream may have a sulfur content ranging from less than 200 ppbw, alternatively less than 100 ppbw, alternatively from about 10 parts per billion by weight (ppbw) to about 100 ppbw. If present, such poisons can be removed using methods known to those skilled in the art. In some embodiments, the feed can be purified by first using conventional hydrofining techniques, then using sorbents to remove the remaining poisons, as is known to those of skill in the art. Such hydrofining techniques and sorbents may be utilized in the systems and methods described herein.

The reforming reactions may occur under process conditions that thermodynamically favor the dehydrocyclization reaction and limit undesirable hydrocracking reactions. Operating ranges for a typical catalytic reforming process, such as an aromatization process, may include reactor inlet temperatures between 700° F. and 1050° F.; a system pressure between 0 pounds per square inch gauge (psig) and about 500 psig; a recycle hydrogen rate sufficient to yield a hydrogen to hydrocarbon mole ratio for the feed to the reforming reactor zone between 0.1 and 20; and a liquid hourly space velocity for the hydrocarbon feed over the reforming catalyst of between 0.1 and 10. The operating temperatures generally may include reactor inlet temperatures from about 700° F. to about 1050° F.

With reference to FIGS. 2 and 3, the feed may be introduced into middle annulus vapor zone 15B/115B of the BRFR via a first opening or inlet at the bottom of middle annulus vapor zone 15B/115B and a second opening or inlet at the bottom of middle annulus vapor zone 15B/115B via piping 42B/142B of manifold 40/140, and a product comprising aromatic hydrocarbons removed from outer annulus vapor zone 15A/115A via a first opening or outlet at the bottom of outer annulus vapor zone 15A/115A and a second opening or outlet at the bottom of outer annulus vapor zone 15A/115A via piping 42A/142A, and also removed from central annulus vapor zone 15C/115C via piping 42C/142C, respectively, of manifold 40/140. In such embodiments, middle annulus vapor zone 15B/115B, positioned between central annulus vapor zone 15C/115C and outer annulus vapor zone 15A/115A, can be utilized as the process inlet, while central annulus vapor zone 15C/115C and outer annulus vapor zone 15A/115A can be utilized as process outlets.

In alternative embodiments, the feedstock may be introduced into central annulus vapor zone 15C/115C of the BRFR via piping 42C/142C of manifold 40/140, and a product comprising aromatic hydrocarbons removed from outer annulus vapor zone 15A/115A and middle annulus vapor zone 15B/115B via piping 42A/142A and 42B/142B, respectively, of manifold 40/140. In such embodiments, central annulus vapor zone 15C/115C can be utilized as the process inlet, while middle annulus vapor zone 15B/115B and outer annulus vapor zone 15A/115A can be utilized as process outlets.

In embodiments one inlet and outlet are controlled by valve A and Valve B, while valves AA and BB can be opened to eliminate dead zones. In embodiments, valves AA and BB are smaller than valves A and B. In applications, the feed may be staggered to one catalyst bed at a time. For example, feed may be introduced to one inlet (e.g., via opening of valve A and closing of valve B) for the first half of a run and then introduced into a second inlet (e.g., via opening of valve B and closing of valve A) for the second half of the run. In such a mode of operation, a very small flow can be introduced to the catalyst bed not currently being utilized, to minimize or eliminate the existence of dead zones. In such modes, when valve A is open, valve BB may also be open, while valves B and AA are closed.

In embodiments, inner catalyst zone or inner catalyst basket 20B/120B/120B'/220B and outer catalyst zone or outer catalyst basket 20A/120A/120A'/220A are loaded with different catalyst types/compositions, different size catalyst, different shape catalyst, and/or catalyst with a different percentage/loading of noble metals. Utilization of catalyst of different diameter/volume/size in inner catalyst zone or inner catalyst basket 20B/120B/120B'/220B and outer catalyst zone or outer catalyst basket 20A/120A/120A'/220A may provide for decreased pressure drop buildup during operation. In embodiments, catalyst in outer catalyst zone 20A/120A/120A'/220A has a smaller average annular diameter and/or pellet volume than catalyst in inner catalyst zone or inner catalyst basket 20B/120B/120B'/220B. In other embodiments, catalyst in outer catalyst zone 20A/120A/120A'/220A has a larger average annular diameter and/or pellet volume than catalyst in inner catalyst zone 20B/120B/120B'/220B. In embodiments, middle annulus vapor zone 15B/115B is utilized as a heat input zone between inner catalyst zone or inner catalyst basket 20B/120B/120B' and outer catalyst zone or outer catalyst basket 20A/120A/120A' within the BRFR. In this manner, hydrocarbon feed may be introduced to central annulus vapor zone 15C/115C or outer annulus vapor zone 15A/115A, and product removed from outer annulus vapor zone 15A/115A or central annulus vapor zone 15C/115C, respectively. In embodiments, additional heat input into middle annulus vapor zone 15B/115B is provided by hydrocarbon feed and/or hydrogen flow routed from the outlet of a heat transfer apparatus (e.g., a furnace or fired heater); in such an embodiment, piping is configured to introduce the 'hot' hydrocarbon feed and/or hydrogen from the outlet of the heating apparatus into piping 42B/142B of manifold 40/140 for introduction into middle annulus vapor zone 15B/115B. In embodiments, radiant heating tubes configured for the flow of a heat source through the tubes or other reactor internals are positioned such that additional heat input is provided to the catalyst zone(s). In such embodiments, the heating media does not enter the catalyst bed(s), but rather provides radiant heat through the tubes or other reactor internals. For example, the heating media may be provided by a hot effluent stream (e.g., reformer effluent comprising aromatic hydrocarbons), electrical heating elements, a hot oil system, a furnace flue gas, and/or another heating method known to those of skill in the art.

As noted hereinabove, the BRFRs of this disclosure are configured with a manifold operable to reverse the vapor flow through the catalyst zones. Reversal of the process flow may be utilized to provide more complete utilization of the catalyst, for example when larger diameter catalyst beds are to be used. Reversal of the vapor flow may also provide enhanced reactant distribution during special procedures, such as, for example, in situ catalyst regeneration.

Also disclosed herein is an integrated system comprising two or more bi-modal radial flow reactors according to this disclosure. Such an integrated system can comprise any two of the herein-disclosed BRFRs selected from fixed bed BRFRs, removable catalyst basket BRFRs, and BRFGBRs. In embodiments, an integrated system according to this disclosure comprises a BRFGBR upstream of one or more removable catalyst basket BRFR. In embodiments, an integrated system according to this disclosure comprises a BRFGBR upstream of one or more fixed bed BRFR. In embodiments, an integrated system according to this disclosure comprises one or more removable catalyst basket BRFR upstream of one or more fixed bed BRFR. In embodiments, an integrated system according to this disclosure comprises a BRFGBR upstream of one or more removable catalyst basket bed BRFR, which one or more removable catalyst basket BRFR is itself upstream of one or more fixed bed BRFR.

Figure 7:
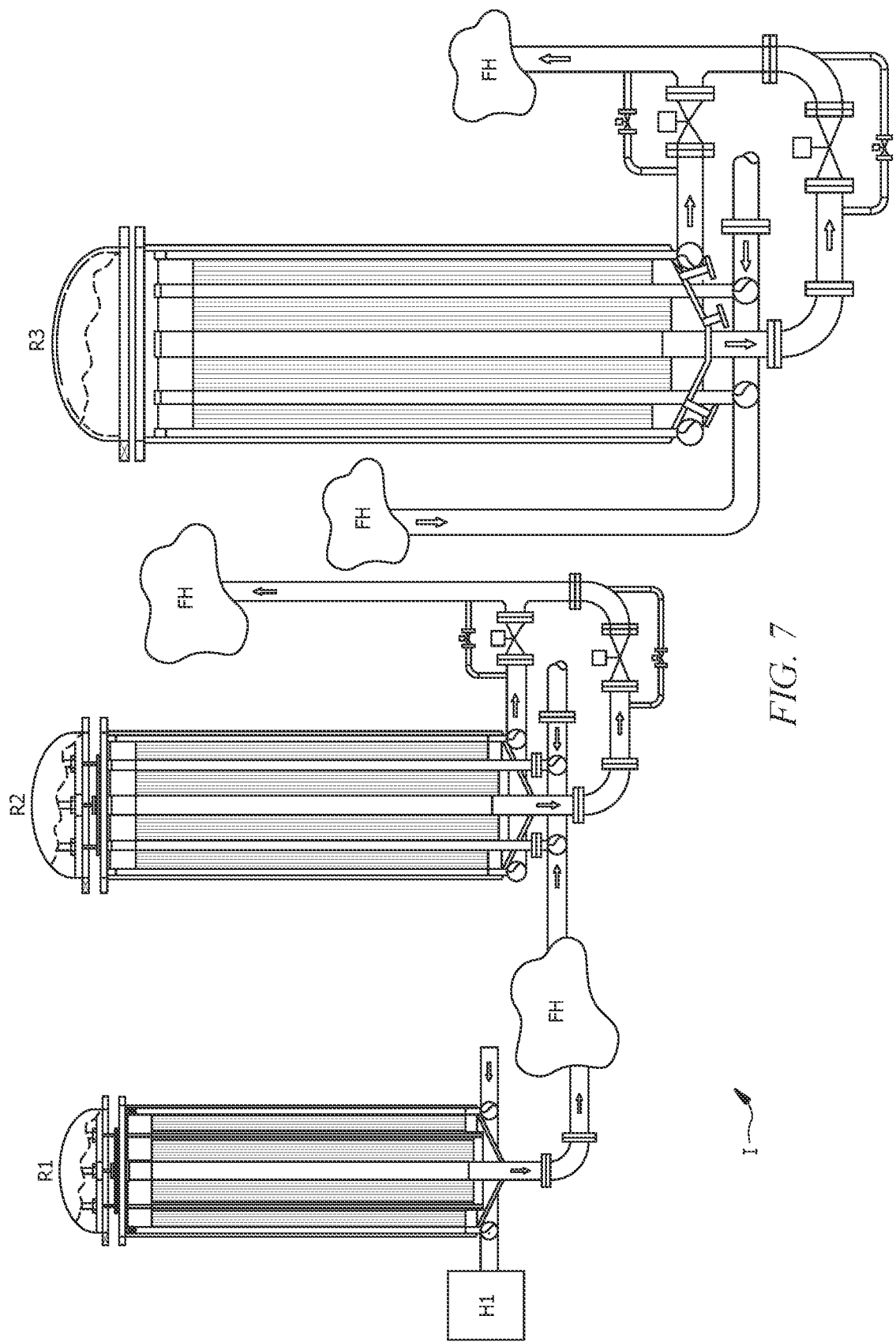
FIG. 7 is a schematic of an integrated reactor loop design comprising a bi-modal radial flow guard bed reactor, a removable catalyst basket bi-modal radial flow reactor, and a fixed bed bi-modal radial flow reactor according to an embodiment of this disclosure.

An integrated system according to an embodiment of this disclosure will now be described with reference to FIG. 7. Integrated system I of the embodiment of FIG. 7 comprises a first reactor R1, a second reactor R2, and a third reactor R3. In embodiments, first reactor R1 is a BRFGBR according to this disclosure, second reactor R2 is a removable catalyst basket BRFR according to this disclosure, and third reactor R3 is a fixed bed BRFR according to an embodiment of this disclosure. In embodiments, first, second, and/or third reactors R1, R2, and/or R3 are reforming reactors containing reforming catalyst. Each reactor may therefore be associated with heating apparatus upstream thereof. For example, in FIG. 7, heat exchanger H1 serves to transfer heat between a hot product stream of the system and a feed, thus heating/vaporizing the feed prior to introduction into BRFGBR R1, and fired heaters FH may be utilized to increase the temperature of a reactor outlet stream prior to introduction into the next reactor in the series.

Figure 8:
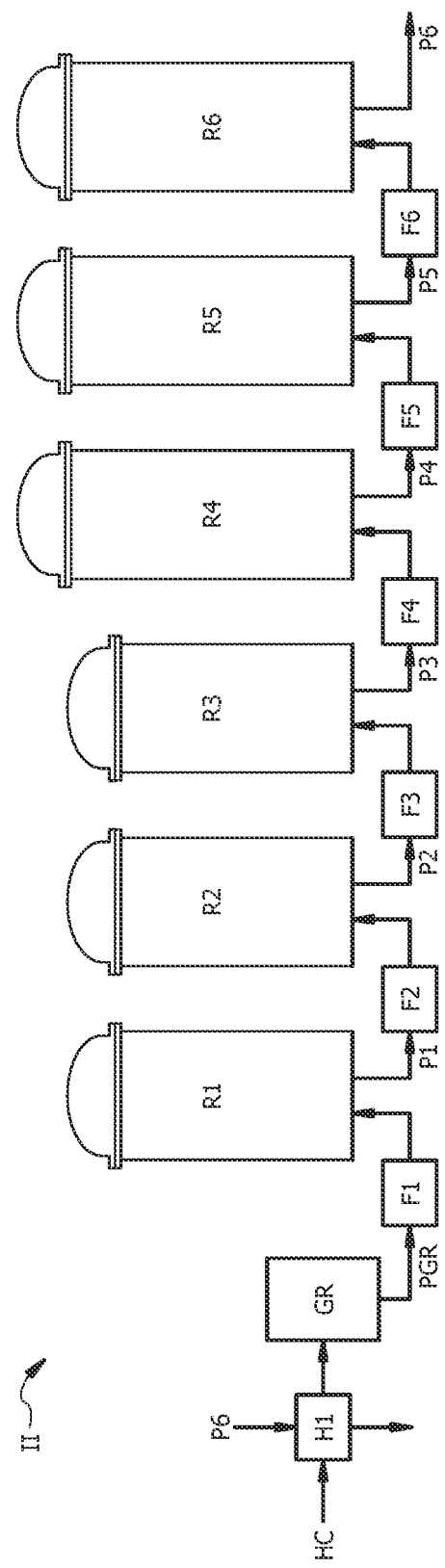
FIG. 8 is a schematic of an integrated reactor loop design comprising a bi-modal radial flow guard bed reactor, three removable catalyst basket bi-modal radial flow reactors, and three fixed bed bi-modal radial flow reactors according to an embodiment of this disclosure.

In embodiments, an integrated system comprises two or three removable catalyst basket BRFRs and two or three fixed bed BRFRs. A schematic of such a system II is provided in FIG. 8. System II comprises a guard bed reactor, GR, in series with three removable catalyst basket BRFRs, R1, R2, and R3, and three fixed bed BRFRs, R4, R5, and R6. A feed/effluent heat exchanger H1 is operable to raise the temperature of/vaporize a hydrocarbon feed, HC, introduced thereto via heat exchange with the product P6 of the system. Fired heaters F1-F6 serve to raise the temperature of the effluent PGR-P6 from the corresponding reactor prior to introduction into the next reactor in the series, as known in the reforming art.

In embodiments, the volume of each of the three removable catalyst basket bi-modal radial flow reactors, R1, R2, and R3, is less than the volume of each of the three fixed bed bi-modal radial flow reactors, R4, R5, and R6. In embodiments, the removable catalyst basket BRFRs have a catalyst volume that is at least 10%, 20%, or 30% less than the volume of the fixed bed BRFRs. In embodiments, guard reactor GR is a BRFGBR, such as BRFGBR 210 of FIGS. 5A and 5B, and comprises an inner catalyst basket such as inner catalyst basket 220B of FIG. 5A comprising reforming catalyst and/or sulfur adsorbing media, and an outer catalyst basket such as outer catalyst basket 220A of FIG. 5A comprising iron trap media.

The BRFRs of this disclosure may provide a number of benefits relative to conventional radial flow reactors. Without limitation, a number of potential advantages will be outlined hereinbelow. Configuration of the reactor internals to create at least three annulus vapor zones and at least two catalyst zones, such that an outer annulus vapor zone, a middle annulus vapor zone, and a central annulus vapor zone are provided by appropriate separation and spacing of the at least two catalyst zones will, in embodiments, enhance utilization of the catalyst. Via embodiments of the system and method disclosed herein, a volume of catalyst can be split (e.g., in half), and each half utilized differentially. As noted hereinabove, reforming reactions, such as the ARO-MAX® Process, are extremely endothermic. As vaporized feed transits the reactor bed from the scallops to the centerpipe, the temperature of the catalyst may quickly drop below the activation temperature for the dehydrogenation reactions. Thus, as working catalyst deactivates, the reactor inlet temperature is generally increased in order to compensate for loss of selectivity. High temperature at deactivation zones results in high cracking reactions, which determine the end of run criteria. Thus, much of the catalyst near the vapor outlet zone is not fully utilized. The herein-disclosed BRFRs may provide more complete utilization of catalyst relative to conventional radial flow reactors in which catalyst near the (single) vapor outlet zone tends to not be fully utilized at the end of a run. In embodiments, more complete utilization of the catalyst, as provided by the herein-disclosed BRFRs, may allow for a reduced number of furnaces and reactors in a reactor train. For example, utilization of one or more BRFR of this disclosure in a reforming reactor train comprising a series of reforming reactors and associated furnaces may enable a decrease in the overall number of reactor/furnace pairs needed to provide a desired conversion or selectivity. Furthermore, enabling more complete utilization of catalyst may translate into a reduction in the volume of catalyst required for a given run length and/or desired product yield, without sacrificing run life. As utilized herein, 'fully utilized' or 'complete utilization of' catalyst, refers to catalyst which is, at the end of run (which end is determined by economics associated with production of undesirable byproducts) producing less than the desired product yield, e.g. product downgrade due to cracking, which produces more light ends valued as fuel gas. For an Aromax® Process this end of run condition can be equated to catalyst that has become 65, 70, or 75% spent. In embodiments, a BRFR of this disclosure provides a longer run time prior to catalyst change-out relative to a conventional, uni-modal radial flow reforming reactor operated to provide equivalent selectivity. In embodiments, the run time is increased by 25, 30, or 35 percent.

The more complete utilization of catalyst provided by the BRFR of this disclosure may enable operation with a lower end of run reactor temperature. Such a reduction in the end of run temperature translates into lower internal metal temperatures, which may provide a concomitant decrease in carburization and metal loss rates within furnace tubes of furnaces associated with the BRFR. Furthermore, the BRFRs of this disclosure may thus provide for operation closer to isothermal conditions, which may result in increased selectivity.

Introduction of the feed vertically into the vapor zone(s) of the BRFRs may eliminate the need for separate flow distributors, pie-plate cover plates, which are a typical means of providing flow diversion at the top of the reactor bed, and associated bolting methods for attaching cover plates. Because the piping for introducing the feed and removing product effluent are both located at the bottom of the herein-disclosed BRFR, less piping may be required relative to conventional radial flow reactors. The design of the herein-disclosed BRFRs can eliminate the support ball media typically utilized in radial flow reactors. In embodiments, bottom support media is eliminated, due to the design of the reactor internals, and support media which is typically installed at the top of a radial flow reactor can also be eliminated, since only a small layer of bed settling catalyst is installed at the top of the reactor above the vapor flow path (e.g., no vapor enters or exits through the top of the catalyst bed.

The catalyst drain ports on the fixed bed BRFR and the removable catalyst baskets of the removable catalyst basket BRFR enable routine catalyst replacement, in embodiments, without a human entering the reactor. This may provide for safer operation during catalyst dumping and loading. Additionally, the facilitation of catalyst removal and replacement via the herein-disclosed BRFRs may enable catalyst replacement in less time (e.g., in embodiments, in one-third of the time) currently required for typical catalyst dumping and loading for conventional radial flow reactors. This time reduction may provide substantial savings with respect to expenses due to down time. The potential for smaller volume reactors (due to more complete utilization of catalyst) and reduction in turnaround time provided by the facilitated catalyst replacement could provide for reduced capital costs during plant build and fixed cost savings related to reactor turnarounds. In embodiments, the fixed bed BRFR provides a reduction of at least 5%, 10%, or 12% in a turnaround time for catalyst change-out relative to a comparably sized, conventional radial flow reactor with a fixed catalyst bed. In embodiments, the removable bed BRFR provides a reduction of at least 25%, 50%, or 75% in a turnaround time for catalyst change-out relative to a comparably sized, conventional radial flow reactor with a fixed catalyst bed. In embodiments, the BRFR provides for minimized downtime. For example, in embodiments, spare baskets can be loaded prior to shutdown.

As discussed hereinabove, the bi-modal design provided herein can be utilized as a radial flow guard reactor (i.e., a BRFGBR), which may provide for elimination of a conventional, higher pressure drop guard reactor and/or sulfur converter adsorber. Utilization of such a guard reactor may further reduce capital cost associated with a reactor system comprising the BRFGBR.

For applications in which regeneration of catalyst is desired, regeneration reactants may be more evenly distributed throughout the catalyst beds/zones of the herein-disclosed BRFRs relative to conventional radial flow reactors. For example, in regenerations employing halides, this more even distribution may provide for attaining a lower halide concentration in a vapor stream exiting the reactor during regeneration, which may help protect the metallurgy of the reactor/system. In embodiments, oxidation of spent catalyst may be improved via use of the herein-disclosed reactor, system, or method. Such improvement in the oxidation of spent catalyst may result in reduced costs associated with down time and/or a reduction in the potential for hazardous waste shipping.

In embodiments, the BRFR provides for minimized cracking by being able to move flow to the second bed after catalyst in the initial zone is deactivated.

ADDITIONAL DESCRIPTION

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments disclosed herein include:

A: A bi-modal radial flow reactor comprising: a cylindrical outer housing surrounding at least five cylindrical, concentric zones, including at least three annulus vapor zones and at least two catalyst zones, wherein the at least two catalyst zones comprise an outer catalyst zone and an inner catalyst zone, and wherein the at least three annulus vapor zones comprise an outer annulus vapor zone, a middle annulus vapor zone, and a central annulus vapor zone, and wherein the outer catalyst zone is intercalated with the outer annulus vapor zone and the middle annulus vapor zone, and wherein the inner catalyst zone is intercalated with the middle annulus vapor zone and the central annulus vapor zone; and a manifold configured to introduce a feed vertically into a bottom end of each of one or two of the at least three annulus vapor zones, and remove a product from a bottom end of each of the one or two remaining of the at least three annulus vapor zones.

B: A bi-modal radial flow guard bed reactor comprising: a cylindrical outer housing surrounding at least five cylindrical, concentric zones, including at least two annulus vapor zones, at least two catalyst zones, and a bed separation zone, wherein the at least two catalyst zones comprise an outer catalyst zone and an inner catalyst zone, wherein the at least two annulus vapor zones comprise an outer annulus vapor zone, and a central annulus vapor zone, and wherein the outer catalyst zone is intercalated with the outer annulus vapor zone and the bed separation zone, and wherein the inner catalyst zone is intercalated with the bed separation zone and the central annulus vapor zone; and a manifold configured to introduce a feed vertically into a bottom end of the outer annulus vapor zone, and remove a product from a bottom end of the central annulus vapor zone.

C: A bi-modal radial flow reactor comprising: a cylindrical outer housing surrounding five cylindrical, concentric zones, including three annulus vapor zones and two catalyst zones, wherein the two catalyst zones comprise an outer catalyst zone and an inner catalyst zone, wherein the inner catalyst zone and the outer catalyst zone are configured as removable catalyst baskets, and wherein the three annulus vapor zones comprise an outer annulus vapor zone, a middle annulus vapor zone, and a central annulus vapor zone, and wherein the outer catalyst zone is intercalated with the outer annulus vapor zone and the middle annulus vapor zone, and wherein the inner catalyst zone is intercalated with the middle annulus vapor zone and the central annulus vapor zone; and a manifold configured to introduce a feed vertically into a bottom end of each of one or two of the three annulus vapor zones, and remove a product from a bottom end of each of the one or two remaining of the three annulus vapor zones.

D: A reactor system comprising a bi-modal radial flow guard bed reactor as described herein, at least one removable catalyst basket bi-modal radial flow reactor as described herein, and at least one fixed bed bi-modal radial flow reactor as described herein, wherein the bi-modal radial flow guard bed reactor is upstream of the at least one removable catalyst basket bi-modal radial flow reactor, and wherein the at least one removable catalyst basket bi-modal radial flow reactor is upstream of the at least one fixed bed bi-modal flow radial reactor.

E: A bi-modal radial flow reactor comprising: a cylindrical outer housing surrounding at least five cylindrical, concentric zones, including at least three annulus vapor zones and at least two catalyst zones, wherein the at least two catalyst zones comprise an outer catalyst zone and an inner catalyst zone, and wherein the at least three annulus vapor zones comprise an outer annulus vapor zone, a middle annulus vapor zone, and a central annulus vapor zone, wherein the central annulus vapor zone extends along a centerline of the bi-modal radial flow reactor, and wherein the outer catalyst zone is intercalated with the outer annulus vapor zone and the middle annulus vapor zone, and wherein the inner catalyst zone is intercalated with the middle annulus vapor zone and the central annulus vapor zone; and a removable head cover fixably coupled to a top of the cylindrical outer housing to seal a top of the bi-modal radial flow reactor.

F: A bi-modal radial flow reactor comprising: a cylindrical outer housing surrounding at least five cylindrical, concentric zones, including at least three annulus vapor zones and at least two catalyst zones, wherein the at least two catalyst zones comprise an outer catalyst zone and an inner catalyst zone, and wherein the at least three annulus vapor zones comprise an outer annulus vapor zone, a middle annulus vapor zone, and a central annulus vapor zone, wherein the central annulus vapor zone extends along a centerline of the bi-modal radial flow reactor, and wherein the outer catalyst zone is intercalated with the outer annulus vapor zone and the middle annulus vapor zone, and wherein the inner catalyst zone is intercalated with the middle annulus vapor zone and the central annulus vapor zone, wherein the bi-modal radial flow reactor does not comprise conventional bottom support ball media.

G: A process for replacing catalyst in a bi-modal radial flow reactor, the process comprising: providing a bi-modal radial flow reactor, wherein the bi-modal radial flow reactor comprises: a cylindrical outer housing surrounding at least five cylindrical, concentric zones, including at least three annulus vapor zones and at least two catalyst zones, wherein the at least two catalyst zones comprise an outer catalyst zone and an inner catalyst zone, and wherein the at least three annulus vapor zones comprise an outer annulus vapor zone, a middle annulus vapor zone, and a central annulus vapor zone, wherein the central annulus vapor zone extends along a centerline of the bi-modal radial flow reactor, and wherein the outer catalyst zone is intercalated with the outer annulus vapor zone and the middle annulus vapor zone, and wherein the inner catalyst zone is intercalated with the middle annulus vapor zone and the central annulus vapor zone; operating the bi-modal radial flow reactor until a catalyst in a catalyst zone comprising the outer catalyst zone, the inner catalyst zone, or both is spent; and providing the catalyst zone with catalyst that is not spent.

H: A bi-modal radial flow reactor comprising: a cylindrical outer housing surrounding at least five cylindrical, concentric zones, including at least three annulus vapor zones and at least two catalyst zones, wherein the at least two catalyst zones comprise an outer catalyst zone and an inner catalyst zone, and wherein the at least three annulus vapor zones comprise an outer annulus vapor zone, a middle annulus vapor zone, and a central annulus vapor zone, wherein the central annulus vapor zone extends along a centerline of the bi-modal radial flow reactor, and wherein the outer catalyst zone is intercalated with the outer annulus vapor zone and the middle annulus vapor zone, and wherein the inner catalyst zone is intercalated with the middle annulus vapor zone and the central annulus vapor zone, wherein the outer catalyst zone, the inner catalyst zone, or both the outer catalyst zone and the inner catalyst zone have a diameter in the range of from about 0.5 foot (0.15 m) to about 2 feet (0.61 m).

Each of embodiments A, B, C, D, E, F, G, and H may have one or more of the following additional elements: Element 1: wherein the bi-modal radial flow reactor is a fixed bed bi-modal radial flow reactor, wherein the inner catalyst zone and the outer catalyst zone are configured as fixed beds. Element 2: wherein the fixed beds are provided by fixed catalyst baskets. Element 3: wherein the fixed catalyst baskets are delineated by one or more materials selected from the group consisting of Vee-Wire® screens, wedge wire screens, mesh screens, and wire screens. Element 4: further comprising at least one port fluidly connected with a bottom end of at least one of the at least two catalyst zones, whereby catalyst can be removed therefrom. Element 5: having a diameter in the range of from about 4 feet (1.22 meters) to about 10 feet (3.05 meters), a height of each of the two catalyst zones in the range of from about 10 feet (3.05 meters) to about 30 feet (9.14 meters), or both. Element 6: further comprising a removable head cover fixably coupled to a top end of the cylindrical outer housing. Element 7: wherein the bi-modal radial flow reactor is a removable catalyst basket bi-modal radial flow reactor, wherein the inner catalyst zone and the outer catalyst zone are configured as removable catalyst baskets, with the inner catalyst zone provided by an inner removable catalyst basket and the outer catalyst zone provided by an outer removable catalyst basket. Element 8: wherein the removable catalyst baskets provide a reduction of at least 10% in a turnaround time for catalyst change-out relative to a comparably sized, conventional radial flow reactor with a fixed catalyst bed. Element 9: wherein the removable catalyst baskets are extractable via a top end of the cylindrical outer housing. Element 10: further comprising a removable head cover fixably coupled to a top of the cylindrical outer housing, e.g., to seal a top of the bi-modal radial flow reactor. Element 11: further comprising a cover plate that covers a top end of the central annulus vapor zone, a top end of the middle annulus vapor zone, or both. Element 12: wherein the removable head cover further comprises a pressure plate that serves as the cover plate. Element 13: further comprising a circumferential alignment spacer ring operable to restrict flow out a top end of the outer annulus vapor zone. Element 14: further comprising a packing material around a top ring groove of the outer catalyst zone. Element 15: wherein the packing comprises a ceramic fiber insulation in rope or blanket form, or a high temperature fiber gasket. Element 16: wherein the manifold is operable to reverse the flow such that the feed can be introduced into the remaining one or two of the at least three annulus vapor zones, and the product can be removed from the one or two of the at least three annulus vapor zones. Element 17: wherein the manifold further comprises valves whereby the feed can be introduced into each of at least two inlets of the one or two of the at least three annulus vapor zones at a time. Element 18: wherein at least one of the at least two catalyst zones contains a catalyst. Element 19: wherein the catalyst is capable of catalyzing an endothermic reaction. Element 20: wherein the catalyst is a reforming catalyst capable of catalyzing the conversion of at least a portion of convertible hydrocarbons in the feed into aromatic hydrocarbons that are present in the product. Element 21: wherein the reforming catalyst comprises at least one Group VIII metal and a zeolitic support. Element 22: wherein the Group VIII metal comprises platinum, and wherein the zeolitic support comprises silica-bound L-zeolite. Element 23: wherein the reforming catalyst further comprises at least one halogen. Element 24: wherein the reforming catalyst further comprises potassium. Element 25: wherein the reforming catalyst comprises from about 10 weight percent to about 20 weight percent $K_2O$. Element 26: wherein the bi-modal radial flow reactor provides a longer run time prior to catalyst change-out relative to a conventional, uni-modal radial flow reforming reactor operated to provide equivalent selectivity. Element 27: wherein the bi-modal radial flow reactor is operable at a lower end of run inlet temperature relative to a conventional, uni-modal radial flow reforming reactor operated to provide equivalent selectivity. Element 28: wherein the inner catalyst zone comprises a catalyst that is different from a catalyst in the outer catalyst zone in at least one parameter selected from the group consisting of size, shape, composition, and loading. Element 29: wherein incorporation of different catalyst enables control of a pressure drop across the inner catalyst zone, the outer catalyst zone, or both. Element 30: wherein the inner catalyst zone comprises a different catalyst than the outer catalyst zone. Element 31: wherein the inner catalyst zone comprises a reforming catalyst, a sulfur-adsorber media, or both. Element 32: wherein the outer catalyst zone comprises an iron trap media. Element 33: wherein at least one of the two catalyst zones contains a reforming catalyst capable of catalyzing the conversion of at least a portion of convertible hydrocarbons in the feed into aromatic hydrocarbons that are present in the product. Element 34: comprising three removable catalyst basket bi-modal radial flow reactors as described herein, and three fixed bed bi-modal radial flow reactors as described herein. Element 35: wherein the volume of each of the three removable catalyst basket bi-modal radial flow reactors is less than the volume of each of the three fixed bed bi-modal flow radial reactors. Element 36: wherein the at least one removable catalyst basket bi-modal flow radial reactor and the at least one fixed bed bi-modal flow radial reactor contain a reforming catalyst capable of catalyzing the conversion of at least a portion of convertible hydrocarbons in a feed thereto into aromatic hydrocarbons that are present in a product thereof. Element 37: further comprising a cover plate that covers a top end of the central annulus vapor zone, a top end of the middle annulus vapor zone, or both. Element 38: wherein the removable head cover further comprises a pressure plate that serves as the cover plate, and allows for catalyst expansion in the outer catalyst zone, the inner catalyst zone, or both the outer catalyst zone and the inner catalyst zone. Element 39: wherein the inner catalyst zone and the outer catalyst zone are configured as catalyst baskets, and wherein the pressure plate allows for catalyst expansion in the catalyst baskets. Element 40: wherein the removable head cover further comprises a pressure cover plate that aligns with a top of the central annulus vapor zone when the bi-modal radial flow reactor is closed, a pressure cover plate that aligns with a top of the middle annulus vapor zone when the bi-modal radial flow reactor is closed, or a pressure cover plate that aligns with the top of the central annulus vapor zone and the top of the middle annulus vapor zone when the bi-modal radial flow reactor is closed. Element 41: wherein the outer catalyst zone, the inner catalyst zone, or both the outer catalyst zone and the inner catalyst zone have a diameter in the range of from about 0.5 foot (0.15 m) to about 2 feet (0.61 m), a height of from about 5 feet (1.52 m) to about 50 feet (15.24 m), or both a diameter in the range of from about 0.5 foot (0.15 m) to about 2 feet (0.61 m) and a height of from about 5 feet (1.52 m) to about 50 feet (15.24 m). Element 42: further comprising a manifold configured to introduce a feed vertically into a bottom end of each of one or two of the at least three void vapor zones, and extract a product from a bottom end of each of the one or two remaining of the at least three void vapor zones. Element 43: wherein the manifold is operable to reverse the flow such that the feed can be introduced into the remaining one or two of the at least three void vapor zones, and the product can be extracted from the one or two of the at least three void vapor zones. Element 44: wherein the bi-modal radial flow reactor provides a longer run time prior to catalyst change-out relative to a conventional, uni-modal radial flow reforming reactor operated to provide equivalent selectivity. Element 45: wherein the bi-modal radial flow reactor is operable at a lower end of run inlet temperature relative to a conventional, uni-modal radial flow reforming reactor operated to provide equivalent selectivity. Element 46: further comprising no support media at a top thereof. Element 47: wherein the bi-modal radial flow reactor is a removable basket bi-modal radial flow reactor, wherein the inner catalyst zone and the outer catalyst zone are configured as removable baskets, with the inner catalyst zone provided by an inner catalyst basket and the outer catalyst zone provided by an outer catalyst basket, wherein the bi-modal radial flow reactor comprises no bottom support media between a bottom of the cylindrical outer housing and a bottom of the outer catalyst basket, between a bottom of the cylindrical outer housing and a bottom of the inner catalyst basket, or both between a bottom of the cylindrical outer housing and a bottom of the outer catalyst basket and between a bottom of the cylindrical outer housing and a bottom of the inner catalyst basket. Element 48: wherein the outer catalyst basket, the inner catalyst basket, or both the outer catalyst basket and the inner catalyst basket comprise a support ball media within a bottom thereof. Element 49: further comprising piping configured to introduce a feed vertically into a bottom end of each of one or two of the at least three annulus vapor zones, and piping configured to remove a product from an end of each of the one or two remaining of the at least three annulus vapor zones. Element 50: wherein the one or two of the annulus vapor zones comprises the central annulus vapor zone, and wherein the central annulus vapor zone is fluidly connected with piping configured to introduce the feed vertically into a bottom end of the central annulus vapor zone; or wherein the one or two remaining of the at least three annulus vapor zones comprises the central annulus vapor zone, and wherein the central annulus vapor zone is fluidly connected with piping configured to remove the product from an end of the central annulus vapor zone. Element 51: wherein the bi-modal flow radial reactor is a bi-modal radial flow guard bed reactor. Element 52: wherein the bi-modal radial flow reactor is a removable basket bi-modal radial flow reactor, wherein the inner catalyst zone and the outer catalyst zone are configured as removable baskets, with the inner catalyst zone provided by an inner catalyst basket and the outer catalyst zone provided by an outer catalyst basket, and wherein providing the catalyst zone with catalyst that is not spent further comprises: removing a catalyst basket from the bi-modal radial flow reactor via a top of the bi-modal radial flow reactor, wherein the removed catalyst basket comprises the inner catalyst basket or the outer catalyst basket; and replacing the removed catalyst basket with a replacement catalyst basket comprising fresh or regenerated catalyst. Element 53: further comprising removing a spent catalyst from the removed catalyst basket, and filling the removed catalyst basket from which the spent catalyst has been removed with the fresh or regenerated catalyst to provide the replacement catalyst basket. Element 54: wherein a turnaround time for replacing the catalyst is reduced by at least 25%, 50%, or 75% relative to a turnaround time for catalyst change-out in a comparably sized, conventional radial flow reactor with a fixed catalyst bed. Element 55: further comprising preparing the replacement catalyst basket prior to shutdown of the bi-modal radial flow reactor. Element 56: wherein providing the catalyst zone with catalyst that is not spent further comprises regenerating the spent catalyst. Element 57: wherein the regenerating comprises regenerating in situ. Element 58: wherein regenerating comprises oxidation. Element 59: further comprising at least one port fluidly connected with a bottom end of at least one of the at least two catalyst zones, whereby catalyst can be removed therefrom, wherein providing the catalyst zone with catalyst that is not spent further comprises removing catalyst from the catalyst zone via the at least one port fluidly connected with the bottom end thereof, and filling the catalyst zone with the fresh or regenerated catalyst. Element 60: wherein the filling of the catalyst zone with the fresh or regenerated catalyst is effected via a top thereof. Element 61: wherein a turnaround time for replacing the catalyst is reduced by at least 5%, 10%, or 12% relative to a comparably sized, conventional radial flow reactor with a fixed catalyst bed. Element 62: wherein replacing the catalyst is effected without a human entering the bi-modal radial flow reactor. Element 63: wherein the endothermic reaction comprises reforming. Element 64: wherein the outer catalyst zone, the inner catalyst zone, or both the outer catalyst zone and the inner catalyst zone have a height in a range of from about 5 feet (1.52 m) to about 50 feet (15.24 m). Element 65: wherein a diameter of the bi-modal radial flow reactor is in a range of from about 4 feet (1.22 meters) to about 10 feet (3.05 meters). Element 66: wherein the outer catalyst zone comprises a volume of catalyst that is about equal to a volume of catalyst in the inner catalyst zone. Element 67: further comprising piping configured to introduce a feed vertically into a bottom end of each of one or two of the at least three annulus vapor zones, and piping configured to remove a product from an end of each of the one or two remaining of the at least three annulus vapor zones, wherein the one or two of the annulus vapor zones comprises the central annulus vapor zone, and wherein the central annulus vapor zone is fluidly connected with piping configured to introduce the feed vertically into a bottom end of the central annulus vapor zone; or wherein the one or two remaining of the at least three annulus vapor zones comprises the central annulus vapor zone, and wherein the central annulus vapor zone is fluidly connected with piping configured to remove the product from an end of the central annulus vapor zone. Element 68: further comprising a removable head cover fixably coupled to a top of the cylindrical outer housing to seal a top of the bi-modal radial flow reactor, wherein the removable head cover further comprises an upper dome and a flange, whereby the removable head cover is fixably coupled to the cylindrical outer housing via the flange. Element 69: wherein the bi-modal radial reactor is a bi-modal radial flow guard bed reactor.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A process for replacing catalyst in a bi-modal radial flow reactor, the process comprising: providing a bi-modal radial flow reactor, wherein the bi-modal radial flow reactor comprises:
    a) a cylindrical outer housing surrounding at least five cylindrical, concentric zones, including at least three annulus vapor zones and at least two catalyst zones, wherein the at least two catalyst zones comprise an outer catalyst zone and an inner catalyst zone, and wherein the at least three annulus vapor zones comprise an outer annulus vapor zone, a middle annulus vapor zone, and a central annulus vapor zone, wherein the central annulus vapor zone extends along a centerline of the bi-modal radial flow reactor, and wherein the outer catalyst zone is intercalated with the outer annulus vapor zone and the middle annulus vapor zone, and wherein the inner catalyst zone is intercalated with the middle annulus vapor zone and the central annulus vapor zone; and
    b) a manifold configured to introduce a feed vertically into a bottom end of each of one or two of the at least three annulus vapor zones, and remove a product from a bottom end of each of the one or two remaining of the at least three annulus vapor zones;
    operating the bi-modal radial flow reactor until a catalyst in a catalyst zone comprising the outer catalyst zone, the inner catalyst zone, or both is spent; and
    providing the catalyst zone with catalyst that is not spent by filling the catalyst zone with fresh catalyst, by regenerating the spent catalyst, or a combination thereof.

2. The process of claim 1, wherein the bi-modal radial flow reactor is a removable basket bi-modal radial flow reactor, wherein the inner catalyst zone and the outer catalyst zone are configured as removable baskets, with the inner catalyst zone provided by an inner catalyst basket and the outer catalyst zone provided by an outer catalyst basket, and wherein providing the catalyst zone with catalyst that is not spent further comprises:
    removing a catalyst basket from the bi-modal radial flow reactor via a top of the bi-modal radial flow reactor, wherein the removed catalyst basket comprises the inner catalyst basket or the outer catalyst basket; and
    replacing the removed catalyst basket with a replacement catalyst basket comprising fresh or regenerated catalyst.

3. The process of claim 2, further comprising removing a spent catalyst from the removed catalyst basket, and filling the removed catalyst basket from which the spent catalyst has been removed with the fresh or regenerated catalyst to provide the replacement catalyst basket.

4. The process of claim 2, wherein a turnaround time for replacing the catalyst is reduced by at least 25%, 50%, or 75% relative to a turnaround time for catalyst change-out in a comparably sized, conventional radial flow reactor with a fixed catalyst bed.

5. The process of claim 2 further comprising preparing the replacement catalyst basket prior to shutdown of the bi-modal radial flow reactor.

6. The process of claim 1, wherein regenerating the spent catalyst comprises in situ regeneration.

7. The process of claim 1, wherein the bi-modal radial flow reactor is a fixed bed bi-modal radial flow reactor, wherein the inner catalyst zone and the outer catalyst zone are configured as fixed beds.

8. The process of claim 7, wherein the fixed beds are provided by fixed catalyst baskets and further comprising at least one port fluidly connected with a bottom end of at least one of the at least two catalyst zones, whereby catalyst can be removed therefrom.

9. The process of claim 8, wherein providing the catalyst zone with catalyst that is not spent further comprises removing catalyst from the catalyst zone via the at least one port fluidly connected with the bottom end thereof, and filling the catalyst zone with the fresh or regenerated catalyst.

10. The process of claim 1, wherein replacing the catalyst is effected without a human entering the bi-modal radial flow reactor.

\* \* \* \* \*